US011388225B1

(12) United States Patent
Duraj et al.

(10) Patent No.: US 11,388,225 B1
(45) Date of Patent: Jul. 12, 2022

(54) LOAD BALANCING BASED ON SECURITY PARAMETER INDEX VALUES

(71) Applicant: Cisco Technology, Inc., San Jose, CA (US)

(72) Inventors: Grzegorz Boguslaw Duraj, Vancouver (CA); Leonardo Rangel Augusto, Burnaby (CA); Kyle Andrew Donald Mestery, Woodbury, MN (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/171,645

(22) Filed: Feb. 9, 2021

Related U.S. Application Data

(60) Provisional application No. 63/124,317, filed on Dec. 11, 2020.

(51) Int. Cl.
*G06F 15/16* (2006.01)
*H04L 67/1023* (2022.01)
*H04L 9/40* (2022.01)
*H04L 67/1014* (2022.01)
*H04L 47/125* (2022.01)

(52) U.S. Cl.
CPC ........ *H04L 67/1023* (2013.01); *H04L 47/125* (2013.01); *H04L 63/0478* (2013.01); *H04L 67/1014* (2013.01)

(58) Field of Classification Search
CPC ............. H04L 67/1023; H04L 67/1014; H04L 63/6478; H04L 47/125
USPC .......... 709/202–203, 217–219; 718/102, 105
See application file for complete search history.

(56) References Cited

U.S. PATENT DOCUMENTS

| 7,000,120 | B1 | 2/2006 | Koodli et al. | |
|---|---|---|---|---|
| 9,813,343 | B2* | 11/2017 | Williams | H04L 67/1023 |
| 11,070,363 | B1* | 7/2021 | Kenyan | H04L 67/1023 |
| 2003/0093560 | A1* | 5/2003 | Ono | H04L 67/1023 |
| | | | | 709/244 |
| 2005/0088977 | A1 | 4/2005 | Roch et al. | |
| 2007/0147378 | A1 | 6/2007 | Elgebaly et al. | |
| 2010/0228962 | A1* | 9/2010 | Simon | H04L 63/0471 |
| | | | | 713/150 |
| 2011/0016314 | A1 | 1/2011 | Hu et al. | |
| 2011/0078783 | A1 | 3/2011 | Duan et al. | |
| 2012/0263041 | A1 | 10/2012 | Giaretta et al. | |
| 2014/0056146 | A1* | 2/2014 | Hu | H04L 47/125 |
| | | | | 370/235 |
| 2016/0164845 | A1 | 6/2016 | Mao | |
| 2016/0212098 | A1 | 7/2016 | Roch | |
| 2017/0126645 | A1 | 5/2017 | Froelicher et al. | |
| 2018/0069797 | A1 | 3/2018 | Williams et al. | |
| 2019/0036894 | A1* | 1/2019 | Wang | H04L 63/0485 |

(Continued)

*Primary Examiner* — Bharat Barot
(74) *Attorney, Agent, or Firm* — Lee & Hayes, P.C.

(57) ABSTRACT

Techniques for load balancing encrypted traffic based on security parameter index (SPI) values of packet headers and sets of 5-tuple values of the packet headers are described herein. Additionally, techniques for including quality of service (QoS)-type information in SPI value fields of packet headers are also described herein. The QoS-type information may indicate a particular traffic class according to which the packet is to be handled. Further, techniques for pre-configuring a backend host such that encrypted traffic may be migrated to the backend host from another backend host without causing temporary service disruptions are also described herein.

20 Claims, 13 Drawing Sheets

(56) References Cited

U.S. PATENT DOCUMENTS

| | | | |
|---|---|---|---|
| 2019/0173841 A1* | 6/2019 | Wang | H04L 63/0428 |
| 2019/0173851 A1* | 6/2019 | Jain | H04L 63/0485 |
| 2019/0327112 A1* | 10/2019 | Nandoori | H04L 63/02 |
| 2020/0120078 A1 | 4/2020 | Mao et al. | |
| 2020/0280548 A1 | 9/2020 | Toonk et al. | |
| 2020/0366478 A1 | 11/2020 | Mestery et al. | |
| 2022/0021687 A1* | 1/2022 | Bhattacharya | H04L 47/125 |

* cited by examiner

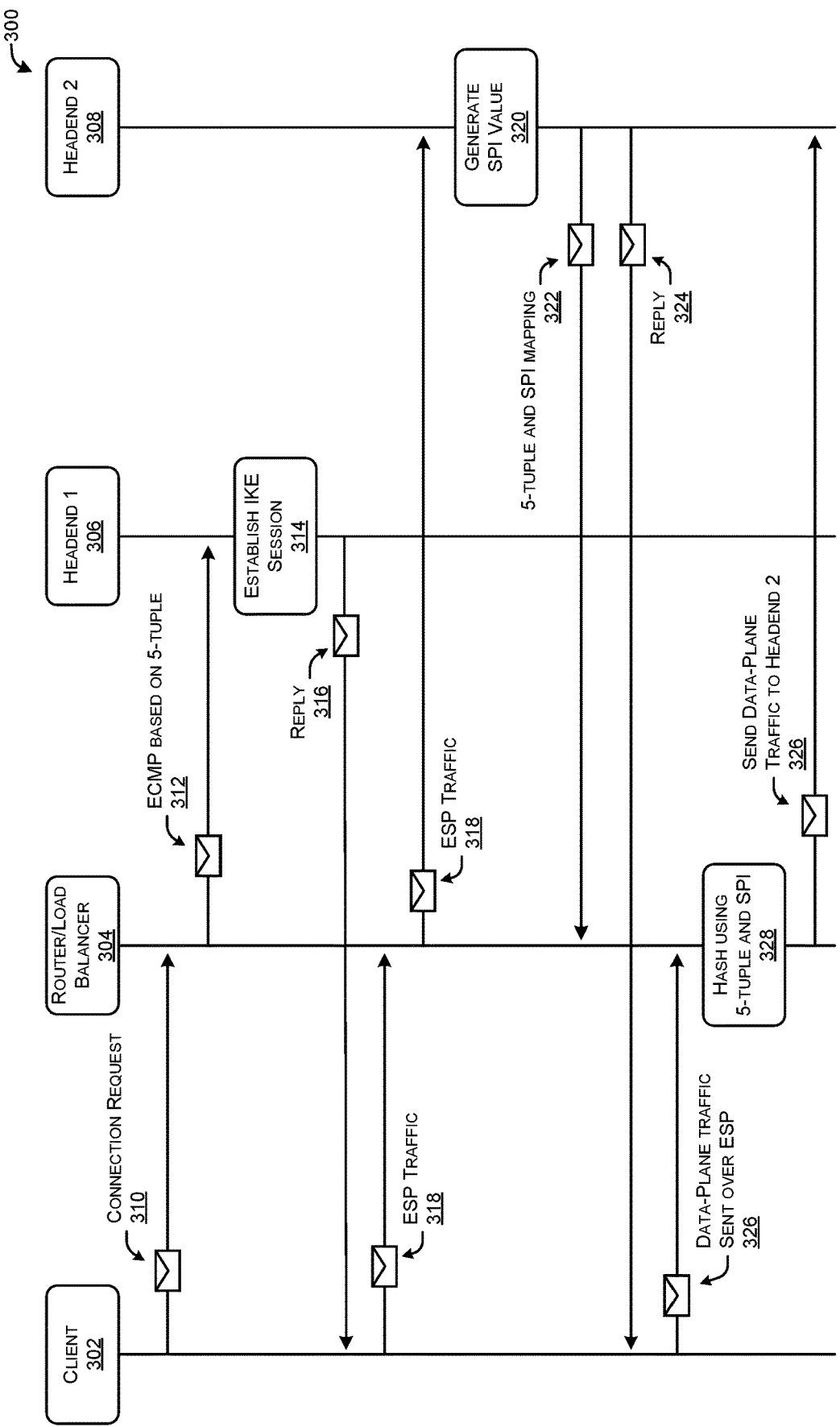

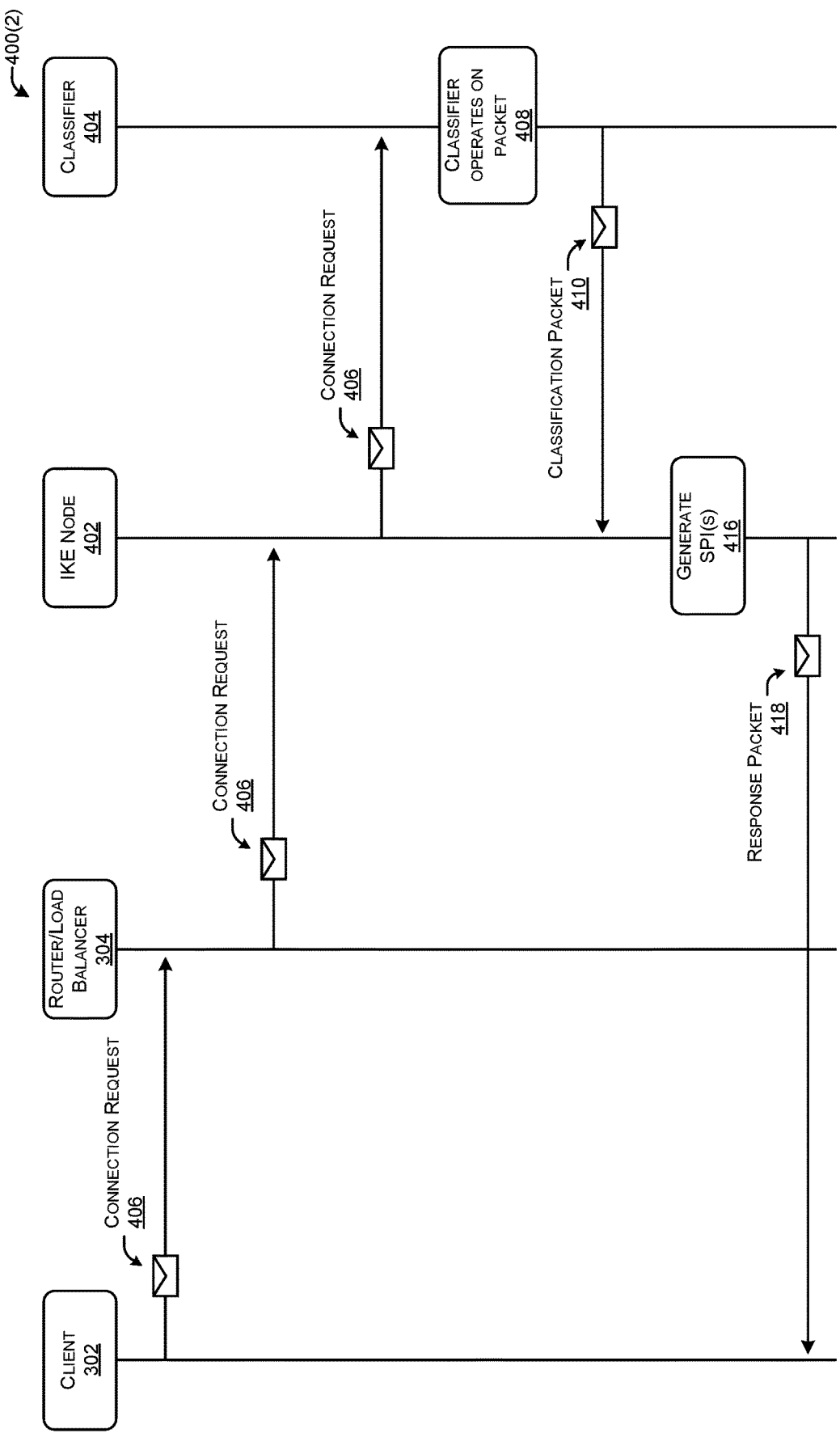

600 ↘

```
RECEIVE, FROM A CLIENT DEVICE AND AT A NETWORK, A REQUEST TO
ESTABLISH AN ENCRYPTED TUNNEL THROUGH THE NETWORK SUCH
THAT DATA-PLANE TRAFFIC MAY FLOW BETWEEN THE CLIENT DEVICE
AND A SERVICE VIA THE ENCRYPTED TUNNEL
602
```

↓

```
DETERMINE THAT THE DATA-PLANE TRAFFIC IS OF A PARTICULAR
TRAFFIC CLASS FROM AMONG A GROUP OF TRAFFIC CLASSES, THE
PARTICULAR TRAFFIC CLASS BEING ASSOCIATED WITH A PARTICULAR
QUALITY OF SERVICE (QoS) PERFORMANCE METRIC
604
```

↓

```
GENERATE A SECURITY PARAMETER INDEX (SPI) VALUE TO BE USED
BY THE CLIENT DEVICE FOR THE DATA-PLANE TRAFFIC, THE SPI
VALUE CORRESPONDING TO THE PARTICULAR TRAFFIC CLASS
606
```

↓

```
SEND, TO THE CLIENT DEVICE, AN INDICATION OF THE SPI VALUE
608
```

↓

```
RECEIVE, AT A LOAD BALANCING NODE ASSOCIATED WITH THE
NETWORK, A DATA PACKET OF THE DATA-PLANE TRAFFIC THAT
INCLUDES THE SPI VALUE
610
```

↓

```
BASED AT LEAST IN PART ON THE DATA PACKET INCLUDING THE SPI
VALUE, SEND THE DATA PACKET THROUGH THE NETWORK SUCH THAT
THE DATA PACKET IS HANDLED ACCORDING TO THE PARTICULAR QoS
PERFORMANCE METRIC
612
```

FIG. 6

LOAD BALANCING BASED ON SECURITY PARAMETER INDEX VALUES

RELATED APPLICATIONS

This application claims priority to U.S. Provisional Patent Application No. 63/124,317, filed on Dec. 11, 2020, the entire contents of which are incorporated herein by reference.

TECHNICAL FIELD

The present disclosure relates generally to improved techniques for load balancing encrypted traffic using security parameter index (SPI) values of a packet header.

BACKGROUND

Building a cloud-delivered, Software-as-a-Service (SaaS) product involves creating a distributed system which is delivered to users in a cloud. Typically, traffic is sent into these services according to one or more routing strategies, such as equal-cost multi-path (ECMP) routing. ECMP and other routing strategies allow for the pinning of flows based on "5-tuples" in order to send packets to specific backend instances. A 5-tuple of a packet generally refers to a set of five different values that comprise a Transmission Control Protocol/Internet Protocol (TCP/IP) connection. The set of values of a 5-tuple includes a source IP address, a source port number, a destination IP address, a destination port number, and the specific protocol that is in use.

However, because ECMP and other routing strategies use 5-tuples, they do not take into account individual flows of encrypted connections, such as an internet protocol security (IPsec) connection, which includes both internet key exchange (IKE) traffic and encapsulating security payload (ESP) traffic. Additionally, encrypted connections (e.g., IPsec), by their very nature of being encrypted, are difficult to provide traffic classification for. Once a packet is encrypted and encapsulated, performing any form of quality of service (QoS) becomes virtually impossible.

Furthermore, in a network environment in which load balancers are placed in front of a pool of worker nodes responsible for handling encrypted traffic, when a worker node is going offline, the encrypted session assigned to the worker node has to be migrated to one or more other hosts. This normally causes temporary service disruption while the new host worker node(s) and the client negotiate a new encrypted connection.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a data flow diagram of an example traffic flow between various nodes and/or devices of a communication session to establish load balancing of traffic using SPI values of a packet header.

FIGS. 4A and 4B illustrate data flow diagrams of example traffic flows between various nodes and/or devices of a communication session to indicate QoS-type information in an SPI value of a packet header.

FIG. 6 illustrates a logic flow diagram of an example method for maintaining QoS treatment of packets by using SPI values.

DESCRIPTION OF EXAMPLE EMBODIMENTS

Overview

Figure 1:
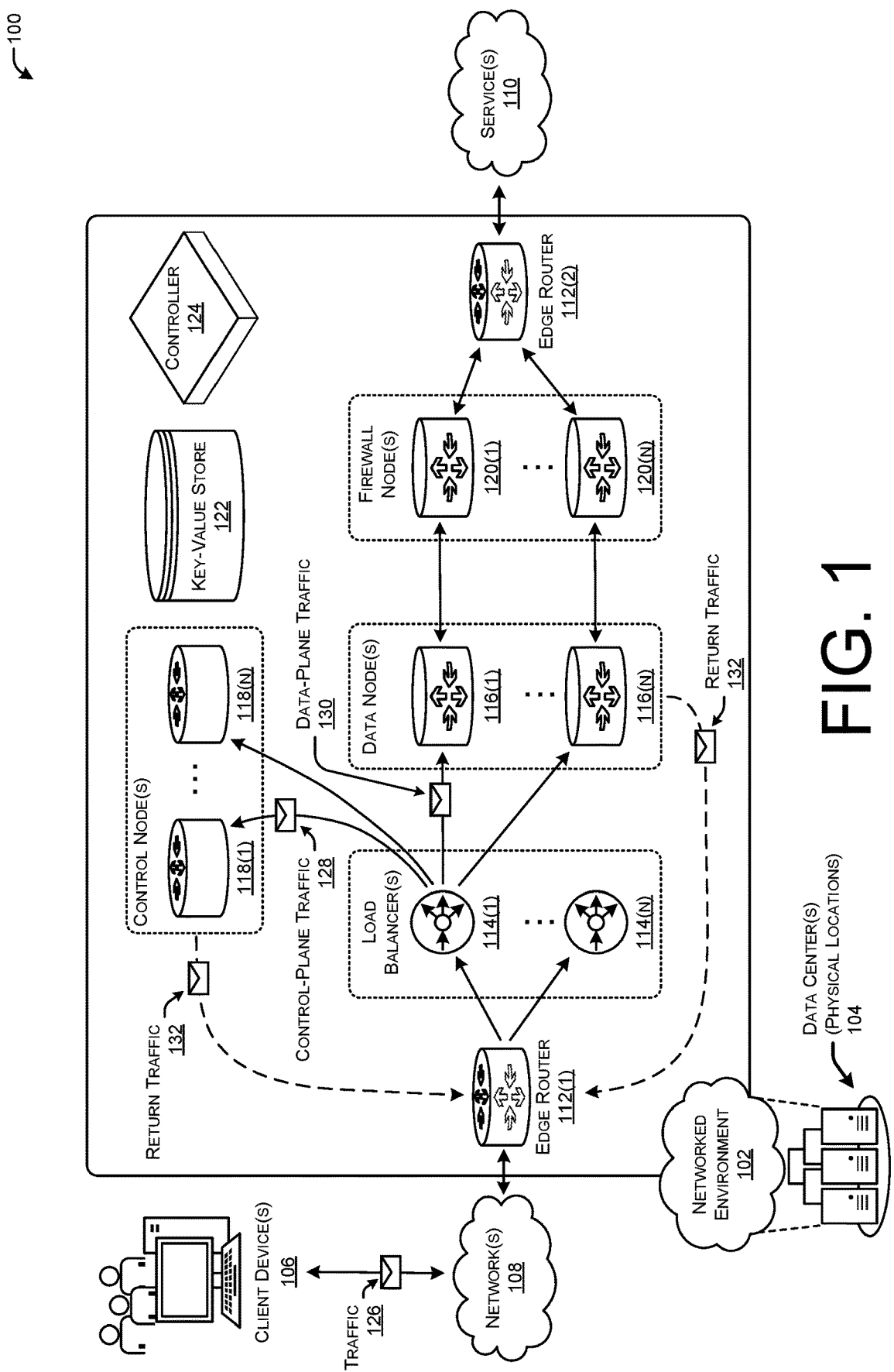
FIG. 1 illustrates a schematic view of an example system-architecture of a networked environment including a tunneled communication session comprising split control plane and data plane traffic flows.

This disclosure describes systems and methods that, among other things, improve technologies related to load balancing encrypted traffic by using security parameter index (SPI) values of a packet header. By way of example, and not limitation, a method according to the various techniques described in this disclosure may include receiving, from a client device and at a network device of a network, a request to establish an encrypted tunnel through the network such that data-plane traffic may flow between the client device and a service via the encrypted tunnel. The method may also include generating an SPI value to be used by the client device for the data-plane traffic and sending, to the client device, an indication of the SPI value. Additionally, the method may include receiving, at a load balancer, a data packet that includes the SPI value and, based at least in part on the SPI value, determining to send the data packet to a server of a group of servers that support the service. Accordingly, the load balancer may send the data packet to the server.

In some instances, the method may additionally or alternatively include determining that the data-plane traffic is of a particular traffic class from among a group of traffic classes. The particular traffic class may be associated with a particular quality of service (QoS) performance metric. As such, the method may include generating an SPI value to be used by the client device for the data-plane traffic. The SPI value may correspond to the particular traffic class. In this way, the load balancer may receive a data packet of the data-plane traffic that includes the SPI value and, based at least in part on the data packet including the SPI value, the load balancer may send the data packet through the network such that the data packet is handled according to the particular QoS performance metric.

In additional or alternative examples, the method may include receiving, at the load balancer and from the client device, first data-plane traffic having a first SPI value and a set of 5-tuple values. Based at least in part on the first SPI value and the set of 5-tuple values, the load balancer may send the first data-plane traffic to a first node. The method may also include receiving, at the load balancer, an indication that at least a portion of the first data-plane traffic is to be sent to a second node. Based at least in part on the indication, the load balancer may prompt the second node to provision one or more interfaces such that at least the portion of the first data-plane traffic may be sent to the second node. In this way, the load balancer may receive, from the client device, second data-plane traffic having a second SPI value and the set of 5-tuple values. Based at least in part on the second SPI value and the set of 5-tuple values, the load balancer may determine that the second data-plane traffic comprises at least the portion of the first data-plane traffic and, in response, send the second data-plane traffic to the second node.

Additionally, the techniques described herein may be performed as a method and/or by a system having non-transitory computer-readable media storing computer-executable instructions that, when executed by one or more processors, performs the techniques described herein.

EXAMPLE EMBODIMENTS

As discussed above, traffic is typically sent into various services according to one or more routing strategies, such as equal-cost multi-path (ECMP) routing. However, because these routing strategies use 5-tuples, they do not take into account individual flows of encrypted connections, such as an internet protocol security (IPsec) connection, which includes both internet key exchange (IKE) traffic and encapsulating security payload (ESP) traffic. This means that entropy for these flows may be much less than what could be achieved if per-tunnel entropy was provided by, for instance, the security associations (SAs) for IPsec IKE and ESP flows. For instance, IPsec IKE and ESP traffic contain additional identifiers called a security parameter index (SPI). An SPI value is used to uniquely identify an established IPsec SA.

Accordingly, one aspect of this disclosure provides techniques for leveraging SPI values to allow load balancing and pinning of per-IPsec IKE and ESP flows to specific backends. By performing these techniques, multiple advantages may be realized, including being able to terminate the same encrypted tunnel/SA on multiple systems, which allows for expanding capacity. Additionally, greater performance may be achieved by having finer-grained control over where both control-plane and data-plane traffic sessions may land on a backend node/server. Further, different traffic may be treated accordingly (e.g., performance levels, allowing customers to have their own backends).

Additionally, encrypted connections (e.g., IPsec), by their very nature of being encrypted, are difficult to provide traffic classification for. Once a packet is encrypted and encapsulated, performing any form of quality of service (QoS) becomes virtually impossible. When specifically looking at building an IPsec cloud delivered virtual private network (VPN) offering, for instance, you are dealing with ESP in IP packets and/or ESP in UDP packets. As such, another aspect of this disclosure includes techniques for encoding and mapping QoS-type information into SPI values such that QoS may be performed on a packet even after the packet is encrypted and encapsulated. Performing these techniques may allow classification of encrypted traffic, thus allowing for DiffServ-style resource allocation on data nodes, making it possible to allocate individual SAs on data nodes better suited for that traffic class, and to also adjust traffic shaping rules within data nodes to adjust network throughput among the flows allocated to it.

Furthermore, in a network environment in which load balancers are placed in front of a pool of worker nodes responsible for handling encrypted traffic, when a worker node is going offline, the encrypted session assigned to the worker node has to be migrated to one or more other hosts. This normally causes temporary service disruption while the new host worker node(s) and the client negotiate a new encrypted connection. Accordingly, yet another aspect of this disclosure comprises techniques for adding support for the backend worker nodes (e.g. data nodes) to signal to the load balancer to indicate a worker node's impending removal from the backend worker node fleet. In this way, these techniques may decrease impact of planned or unplanned shutdowns by migrating encrypted tunnels off a certain worker node when it gets into an unhealthy state or when it's set to be replaced by another. Additionally, these techniques may decrease impact of rebalancing the load across the server pool.

Thus, according to the various techniques described in this disclosure, improvements in computer-related technology may be realized. As noted, entropy for encrypted flows may be much less than what could be achieved if per-tunnel entropy was provided. For instance, most routing strategies, such as ECMP, hash using a set of 5-tuple values. However, leveraging the SPI value of a packet may allow 6-tuple logic to be used, resulting in better allocation of flows to headend nodes. Additionally, the SPI value may be further used to indicate QoS type information for a packet even when the packet has already been encapsulated, making it possible to allocate individual SAs on data nodes better suited for that traffic class. These are just some examples of the multiple improvements that may be realized according to the techniques described in this disclosure. These and other improvements will be easily understood and appreciated by those having ordinary skill in the art.

By way of example, and not limitation, a method according to the various techniques described by this disclosure may include receiving, from a client device, a packet indicating a request to establish an encrypted tunnel through a network such that data-plane traffic may flow between the client device and a service via the encrypted tunnel. In some examples, the request packet may be received at a network by a load balancer or router of the network and the load balancer or router may send the request to a control node of the network. Additionally, the load balancer or router may send the request packet to the control node based at least in part on an equal-cost multi-path (ECMP) routing strategy and/or a 5-tuple associated with the request packet. In some examples, the request to establish the encrypted tunnel may include a request to establish an IPsec connection and/or a request to establish an IPsec SA or child SA.

In some examples, the network may be configured such that the network includes separate control nodes and data nodes. In other words, the network may be configured to split the processing of control-plane traffic (e.g., IKE traffic) and data-plane traffic (e.g., ESP traffic) onto different nodes (e.g., control nodes or "IKE" nodes for processing control-plane and data nodes for processing data-plane). This may allow the network to scale each node type separately and/or independently. The control nodes and the data nodes may comprise headend servers that are associated with a service. In some examples the control nodes may operate on a first set of computing resources associated with the network and the data nodes may operate on a second, different set of computing resources associated with the network.

In some examples, the method may include determining that the data-plane traffic is of a particular traffic class from among a group of traffic classes. The particular traffic class may be associated with a particular quality of service (QoS) performance metric. In some examples, for a control node to create an SPI value that matches the right traffic class, a classifier may be called before establishing an SA. This may be done in multiple different ways. For instance, the load balancer or router may call the classifier and inject class information as a header on the control-plane traffic before it is forwarded to the control node. This may be done by using currently unused fields in the IP header (e.g., DSCP field) or by creating a new field. Additionally, or alternatively, a control node may call the classifier when it is initiating the SA. In any of these ways, a control node may be provided with class information such that the control node may create an SPI value that corresponds to the traffic class.

In some examples, the method may include generating the SPI value to be used by the client device for the data-plane traffic. An SPI value may comprise a combination of bits that identifies a particular SA. In some instances, multiple SPI values may be generated, and each individual SPI value of the multiple SPI values may identify a respective SA. Additionally, the SPI value may be generated by the control node.

As noted above, in various examples an SPI value may include QoS-type information (e.g., differentiated services (DiffServ)-type information, type of service (ToS), differentiated services code point (DSCP)-type information, and/or experimental bits (EXP)-type information) indicating a particular traffic class according to which a packet is to be handled. As such, in some examples generating the SPI value may comprise generating a first combination of bits representing the particular traffic class according to which the packet is to be handled, generating a second combination of bits representing the particular SA, and masking or combining the first combination of bits and the second combination of bits such that the first combination of bits comprises a first portion of the SPI value and the second combination of bits comprises a second portion of the SPI value. For instance, an SPI field of a packet is defined as a 32-bit arbitrary value, with ranges from 0-255 being defined as reserved. This leaves values from 256 (0x00000100) to 4294967295 (0xffffffff) for use as SPI values. Accordingly, in some examples the first portion (e.g., "front" part) of the 32-bit field may be used for QoS mappings and the first hex digit may be "reserved" for the mapping by off-setting the SPI value by 4-bits. For instance, using hexadecimal values 0x[0]3ec7b2a to 0x[f]3ec7b2a, hex digits [0] to [f] may represent the QoS mapping and 0x3ec7b2a may represent the actual SPI offset by the consumed 4-bits. That is, the first portion of the SPI value (e.g., hex digits [0] to [f]) may represent the particular traffic class QoS mapping and the second portion of the SPI value (e.g., hex digits 3ec7b2a) may identify the particular SA. This results in 15 mapping values to use. Additionally, or alternatively, already established 802.1q Class of Service (CoS) or Multiprotocol Label Switching (MPLS) EXP to DSCP bit mappings may be followed since they are of similar bit size.

After the SPI is generated, the method may include sending an indication of the SPI value to the client device. In some examples, the control node may perform direct server return (DSR) to send the indication to the client device. In some examples, a data packet that includes the SPI value may be received by the load balancer. The data packet may comprises a data packet of the data-plane traffic. That is, a protocol associated with the data packet may correspond with a data-plane traffic protocol, such as ESP. In some examples, the data packet may include a set of 5-tuple values. For instance, the set of 5-tuple values of the data packet may include a source IP address value, a source port value, a destination IP address value, a destination port value, and a protocol associated with the data packet. As described herein, a set of 6-tuple values may be used to refer to the SPI value and the set of 5-tuple values. That is, a set of 6-tuple values may include the source IP address value, the source port value, a destination IP address value, the destination port value, the protocol associated with the data packet, and the SPI value. However, different values may be used.

In some instances, the load balancer may determine to send the data packet to a server (e.g., data node) of a group of servers or nodes that support the service. For instance, based at least in part on the SPI value and/or the set of 5-tuple values, the load balancer may determine to send the data packet to the server. In some examples, the load balancer may receive data representative of an association between the SPI value and the set of 5-tuple values associated with the client device and determining to send the data packet to the server may be further based at least in part on the data. That is, the load balancer may be updated with a mapping that indicates associations between SPI values and 5-tuple values. In some examples, determining to send the data packet to the server may be based at least in part on computing a hash value that is representative of the SPI value and/or the set of 5-tuple values. The load balancer may use a hashing function to compute the hash. Additionally, or alternatively, the load balancer may determine to send the data packet to the server based at least in part on one or more routing strategies (e.g., ECMP).

In some examples, the method may include sending the data packet to the server. Additionally, the data packet may be sent through the network such that the data packet is handled according to the particular QoS performance metric and/or traffic class. For instance, if the SPI value includes the indication of the particular traffic class and/or QoS performance metric according to which the packet is to be handled, then the load balancer may send the packet through the network according to that particular traffic class and/or QoS performance metric.

In additional or alternative examples, the method may include generating a second SPI value to be used by the client device for the data-plane traffic. The second SPI value may identify a second SA. The second SPI value may be generated by the control node. In some examples, generating the second SPI value may be based at least in part on classifying the request packet to determine the traffic class associated with the request packet, as described above. After the second SPI is generated, the method may include sending an indication of the second SPI value to the client device. In some examples, the control node may perform direct server return (DSR) to send the indication of the second SPI value to the client device.

In some examples, the method may include receiving, at the load balancer, a second data packet that includes the second SPI value. Additionally, the second data packet may include the set of 5-tuple values, a portion of the set of 5-tuple values, or a new set of 5-tuple values. In some instances, the set of 5-tuple values may indicate that the second data packet was sent by the client device or a different client device. Based at least in part on the second data packet including the second SPI value and or the set of 5-tuple values, the load balancer may send the second data packet to a second server (e.g., second data node) of the group of servers. In some examples, a first portion of the second SPI value may correspond to a second traffic class, the second traffic class being associated with a second QoS performance metric. As such, based at least in part on the second data packet including the second SPI value, the load balancer may send the second data packet through the network such that the second data packet is handled according to the second QoS performance metric.

As noted above, an aspect of the techniques described herein may also include adding support for backend worker nodes (e.g. data nodes) to signal to a load balancer to indicate a worker node's impending removal from the backend worker node fleet. As such, in additional or alternative examples, the method may include receiving, at a load balancer and from a client device, first data-plane traffic having a first SPI value and a set of 5-tuple values. The first SPI value may identify a first security association (SA) between the client device and a first node.

In some examples, the method may include sending the first data-plane traffic to a first node of a group of nodes. In at least one example, the first node may comprise a first data node of a group of data nodes. The first node may be associated with a first encrypted tunnel (e.g., IPsec SA). In some examples, sending the first data-plane traffic to the first node may be based at least in part on the first SPI value and the set of 5-tuple values. For instance, the load balancer may compute a hash value that represents the first SPI value and the set of 5-tuple values (e.g., a 6-tuple). Based at least in part on the hash value, the load balancer may send the first data-plane traffic to the first node according to an ECMP routing strategy.

In various examples, the method may include receiving, at the load balancer, an indication that additional data-plane traffic received from the client device is to be sent to a second node of the group of nodes. In at least one example, the second node may comprise a second data node of the group of data nodes. The second node may be associated with a second encrypted tunnel (e.g., second IPsec SA). In some instances, the indication may comprise an indication that at least a portion of the first data-plane traffic is to be sent to the second node. That is, the indication may notify the load balancer that it needs to adjust where it is sending the data-plane traffic. For example, a load capacity associated with the first node may meet or exceed a threshold load capacity. Additionally, or alternatively, the indication may notify the load balancer that the first node is about to be removed from the group of nodes (e.g., go offline, be serviced, etc.).

In some examples, a controller associated with the network may send the indication to the load balancer or cause the indication to be sent. For instance, the controller may receive telemetry data from the group of nodes. Based at least in part on the telemetry data, the controller may determine that the load balancer is to adjust where it is sending data-plane traffic and/or control-plane traffic. For example, the telemetry data may indicate load capacities associated with respective ones of the group of nodes. Additionally, or alternatively, the telemetry data may indicate statuses associated with respective ones of the group of nodes (e.g., whether a node is in an unhealthy, hung, or crashed state, whether hosts are to be rotated, etc.). As such, the controller may send the indication to the load balancer and/or, in some examples, send a notification to the first node to prompt the first node to send the indication to the load balancer. In some examples, the controller may comprise a distributed system that includes a key-value store.

Based at least in part on the indication, in some examples the load balancer and/or the controller may prompt the second node to provision one or more resources such that the portion of the first data-plane traffic may be sent to the second node. The one or more resources may include interfaces, channels, computing resources, and the like. In this way, by prompting the second node to provision the one or more resources, the second node may be "warmed up" before data-plane traffic is sent to the second node. In examples where a portion of data-plane traffic is being redirected from the first node to the second node, warming up or pre-configuring the second node may help reduce down-time and/or temporary service disruption while the second node and the client device negotiate a new encrypted connection. In at least one example, prompting the second node to provision the one or more resources may include generating and/or sending a null encapsulating security payload (ESP) packet to the second node. The null ESP packet may include an internet protocol (IP) address and a port associated with the client device, as well as, in some instances, other 5-tuple values.

In some examples, the load balancer and/or the controller may send a request to a third node for the third node to generate the second SPI value. The load balancer and/or the controller may send the request based at least in part on the indication. In at least one example, the third node comprises a first control node (e.g., IKE node) of a group of control nodes. Additionally, the request may comprise a "rekey" request. That is, the request may be for the third node to create a second SA between the client device and the second node to take the place of the first SA between the client device and the first node. Accordingly, in some examples the method may include receiving, at the load balancer, an indication of the second SPI value. The indication of the second SPI value may include an indication of an association between the second SPI value and the set of 5-tuple values.

In some examples, the method may include receiving, at the load balancer and from the client device, second data-plane traffic having the second SPI value and the set of 5-tuple values. The second data-plane traffic may comprise some (e.g., a portion) or all of the first data-plane traffic that the load balancer was previously sending to the first node. Based at least in part on the second data-plane traffic having the second SPI value and the set of 5-tuple values, the method may include, in some instances, determining that the second data-plane traffic comprises some (e.g., a portion) or all of the first data-plane traffic. For instance, the second SPI value may be unknown by the load balancer, and the load balancer may keep track of all SPI values associated with a certain set of 5-tuple values. Once the load balancer issues the rekey request, it may start monitoring of new/unknown SPIs related to that set of 5-tuple values and send all data-plane traffic with a new/unknown SPI to the second node.

In some examples, based at least in part on the second SPI value and the set of 5-tuple values, the method may include sending the second data-plane traffic to the second node. Additionally, the method may include, in some instances, removing a first association between the first SPI value and the set of 5-tuple values and/or storing a second association between the second SPI value and the set of 5-tuple values.

Certain implementations and embodiments of the disclosure will now be described more fully below with reference to the accompanying figures, in which various aspects are shown. However, the various aspects may be implemented in many different forms and should not be construed as limited to the implementations set forth herein. For instance, while many of the examples herein are described with respect to ECMP routing, it is to be understood that other routing strategies may be used. Additionally, while many of the examples are shown as distributed systems, it is to be understood that the various processes and methods described may be performed by more or less devices. The disclosure encompasses variations of the embodiments, as described herein. Like numbers refer to like elements throughout.

FIG. 1 illustrates a schematic view of an example system-architecture 100 of a networked environment 102 including a tunneled communication session comprising split control-plane and data-plane traffic flows. Generally, the networked environment 102 may include devices that are housed or located in one or more data centers 104 that may be located at different physical locations. For instance, the networked environment 102 may be supported by networks of devices in a public cloud computing platform, a private/enterprise computing platform, and/or any combination thereof. The one or more data centers 104 may be physical facilities or buildings located across geographic areas that are designated to store networked devices that are part of the networked environment 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the networked environment 102 may not be located in explicitly defined data centers 104 and, rather, may be located in other locations or buildings.

The networked environment 102 may be accessible to client devices 106 over one or more networks 108. The networked environment 102, and the networks 108, may each respectively include one or more networks implemented by any viable communication technology, such as wired and/or wireless modalities and/or technologies. The networked environment 102 and networks 108 may each may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.), Virtual Private Networks (VPNs), Wide Area Networks (WANs)—both centralized and/or distributed—and/or any combination, permutation, and/or aggregation thereof. The networked environment 102 may include devices, virtual resources, or other nodes that relay packets from one network segment to another by nodes in the computer network.

In some examples, the networked environment 102 may provide, host, provide connectivity to, or otherwise support one or more services 110 for client devices 106 to connect to and use. The client devices 106 may comprise any type of device configured to communicate using various communication protocols (e.g., VPN, SSL, TLS, DTLS, and/or any other protocol) over the networks 108. For instance, the client device 106 may comprise a personal user device (e.g., desktop computers, laptop computers, phones, tablets, wearable devices, entertainment devices such as televisions, etc.), network devices (e.g., servers, routers, switches, access points, etc.), and/or any other type of computing device.

In some examples, the networked environment 102 may include edge routers 112(1) and 112(2) (hereinafter referred to collectively as "edge routers 112"), load balancers 114 (1)-114(N) (hereinafter referred to collectively as "load balancers 114") (where N represents any number greater than or equal to one), data nodes 116(1)-116(N), control nodes 118(1)-118(N), firewall nodes 120(1)-120(N), a key-value store 122, and a controller 124. In various examples, the various systems/devices/nodes of the networked environment 102 may communicate with one another via a management plane and/or a message bus associated with the networked environment 102. For instance, a common message bus associated with the networked environment 102 may enable a data node to signal to a load balancer that it is impending removal from the data node fleet, that the load balancer needs to adjust where it is sending flows, and the like. Further, the message bus associated with the networked environment 102 may enable any of the devices/systems/nodes of the networked environment 102 to communicate directly with one another.

In some examples, the edge routers 112 and the load balancers 114 may use ECMP, which is a strategy where next-hop packet forwarding to a single destination can occur over multiple "best paths" which tie for top place in routing metric calculations. Further, any routing strategy may be used by the edge routers 112 and the load balancers 114, such as Open Shortest Path First (OSPF), Intermediate System to Intermediate System (ISIS), Enhanced Interior Gateway Routing Protocol (EIGRP), Domain Name System (DNS) load balancing, and/or Border Gateway Protocol (BGP) in conjunction with, or alternative to, ECMP routing. Although shown in FIG. 1 as separate entities, it is to be appreciated that in some instances the edge routers 112 and the load balancers 114 may reside on a same hardware device and/or node.

The edge routers 112 may, in some instances, balance traffic 126 based on a hash of a network 5-tuple in order to route packets to the load balancers 114. The traffic 126 may include both control-plane traffic 128 and data-plane traffic 130. Additionally, the load balancers 114 may balance traffic 126 based on a hash of a network 6-tuple in order to route control-plane traffic 128 to the control nodes 118 and to route data-plane traffic 130 to the data nodes 116. The network 6-tuple of a packet may include a packet's SPI value, source IP address, source port, destination IP address, destination port, and protocol.

As shown, the networked environment 102 may include data nodes 116(1)-116(N) (hereinafter referred to collectively as "data nodes 116") (where N represents any number greater than or equal to one). In some examples, the data nodes 116 may process data-plane traffic 130 on behalf of the networked environment 102. The data-plane traffic 130 may comprise ESP traffic associated with an IPsec connection. In some examples a data node 116(1) of the data nodes 116 may be associated with one or more IPsec security associations. Additionally, the data nodes 116 may forward data plane traffic 130 to one or more downstream nodes and/or devices, such as the firewall nodes 120(1)-120(N) (hereinafter referred to collectively as "firewall nodes 120") (where N represents any number greater than or equal to one). In some examples, a first data node of the data nodes 116 may be associated with a first traffic class, a second data node of the data nodes 116 may be associated with a second traffic class, and so forth. Additionally, or alternatively, a first interface of a first data node of the data nodes 116 may be associated with a first traffic class, a second interface of the first data node of the data nodes 116 may be associated with a second traffic class, and so forth.

The networked environment 102 may also include one or more control nodes 118(1)-118(N) (hereinafter referred to collectively as "control nodes 118") (where N represents any number greater than or equal to one). In some examples, the control nodes 118 may process control-plane traffic 128 on behalf of the networked environment 102. The control-plane traffic 128 may comprise IKE traffic associated with an IPsec connection.

As shown, both the data nodes 116 and the control nodes 118 may perform direct server return (DSR) to send return traffic 132 back to the client devices 106. That is, the data nodes 116 and the control nodes 118 may send return traffic 132 to the client devices 106 via the edge router 112(1), bypassing the load balancers 114. Additionally, or alternatively, the data nodes 116 and the control nodes 118 may send the return traffic 132 directly to the client devices, bypassing the edge router 112(1).

The networked environment 102 may also include a key-value store 122 and a controller 124. The key-value store 122 may include one or more databases that are accessible to the various nodes and devices of the networked environment 102. In some examples, the load balancers 114, the data nodes 116, the control nodes 118, and other nodes and/or devices of the networked environment 102 may read data from and write data to the key-value store 122. The key-value store 122 may store associations between SPI values and SAs, SPI values and sets of 5-tuple values, and the like. In some examples, the controller 124 may receive telemetry data from the data nodes 116 and/or the control nodes 118 and, based at least in part on the telemetry data, determine statuses associated with individual ones of the data nodes 116 and/or the control nodes 118. For instance, the controller 124 may receive telemetry data indicating a load capacity associated with the data node 116(1). The controller 124 may also determine if the load capacity meets or exceeds a threshold load capacity and, if so, the controller 124 may prompt the data node 116(1) to send a notification to the load balancer 114(1) to request that the load balancer 114(1) adjust where it is sending the data-plane traffic 130.

Although depicted in FIG. 1 as separate hardware components, it should be understood that the edge routers 112, the load balancers 114, the data nodes 116, the control nodes 118, the firewall nodes 120, the key-value store 122, and/or the controller 124 may be software components at least partially residing in memory. In this way, one or more processors may execute instructions that cause the one or more processors to perform all of the operations described herein with respect to the edge routers 112, the load balancers 114, the data nodes 116, the control nodes 118, the firewall nodes 120, the key-value store 122, and/or the controller 124. In some instances, edge routers 112, the load balancers 114, the data nodes 116, the control nodes 118, the firewall nodes 120, the key-value store 122, and/or the controller 124 may be individual hardware components and/or software components that reside in a standalone device or a system of standalone devices. Additionally, or alternatively, the edge routers 112, the load balancers 114, the data nodes 116, the control nodes 118, the firewall nodes 120, the key-value store 122, and/or the controller 124 may include any type of networking device, such as servers, switches, routers, hubs, bridges, gateways, modems, repeaters, access points, etc.

Figure 2:
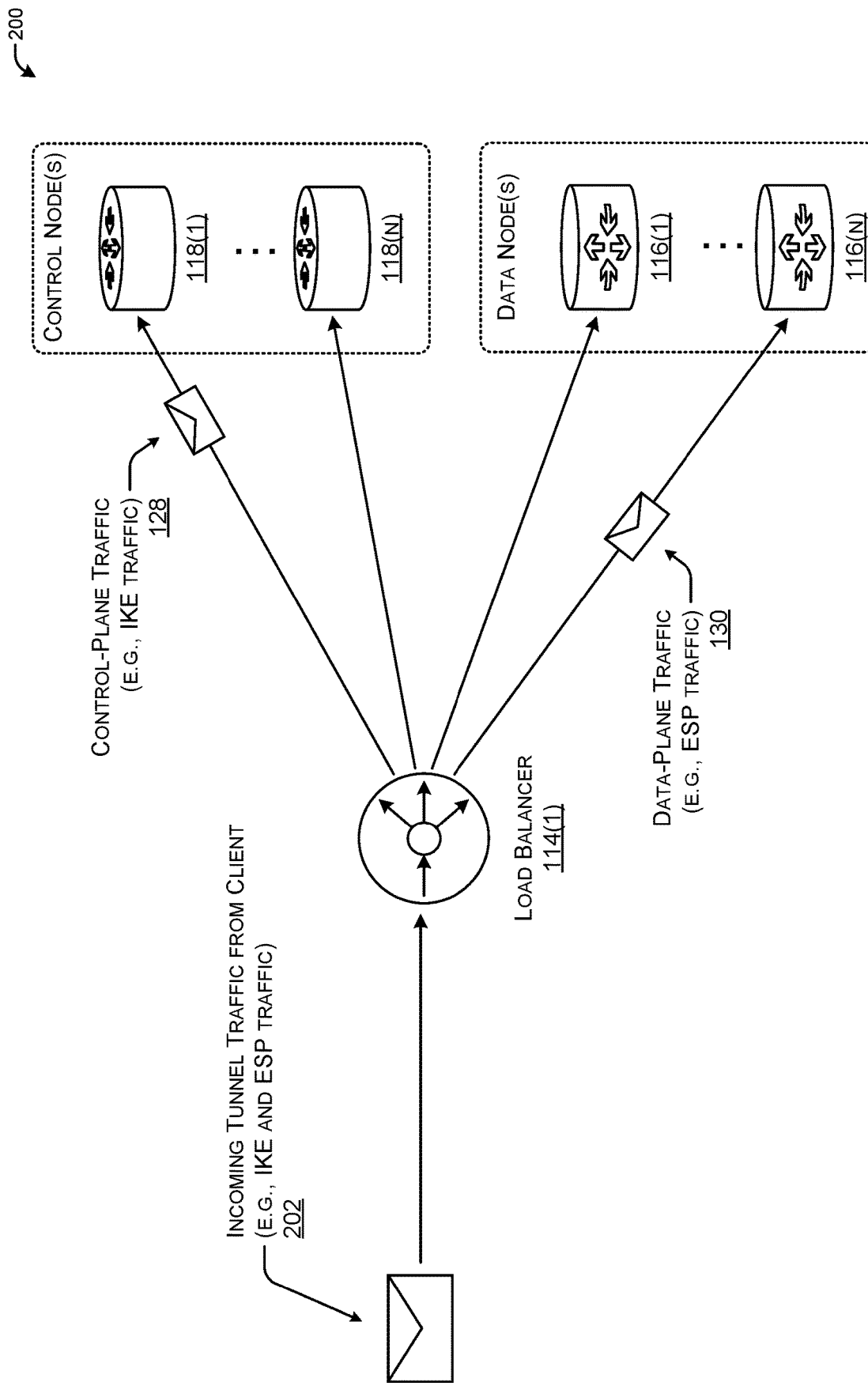
FIG. 2 illustrates a schematic view of an example traffic flow in which a load balancer node sends traffic to downstream nodes according to one or more routing strategies.

FIG. 2 illustrates a schematic view of an example traffic flow 200 in which a load balancer 114(1) sends traffic to downstream nodes according to one or more routing strategies. For instance, the load balancer 114(1) may receive incoming tunnel traffic 202 from a client device, such as the one or more client devices 106. In some instances, the incoming tunnel traffic 202 may comprise control-plane traffic 128 and/or data-plane traffic 130. Additionally, the incoming tunnel traffic 202 may include an SPI value and a set of 5-tuple values.

In some examples, when the load balancer 114(1) receives the incoming tunnel traffic 202, the load balancer 114(1) may compute a hash value that represents the SPI value and the set of 5-tuple values of the incoming tunnel traffic 202. The load balancer 114(1) may then determine, based at least in part on the hash value and using an ECMP routing strategy, a specific node of the data nodes 116 or the control nodes 118 that the incoming tunnel traffic 202 is to be sent to. For instance, if the incoming tunnel traffic 202 comprises control-plane traffic 128 (e.g., IKE traffic), then the load balancer 114(1) may send the control-plane traffic 128 to one of the control nodes 118 based at least in part on the hash value. Likewise, if the incoming tunnel traffic 202 comprises data-plane traffic 130 (e.g., ESP traffic), then the load balancer 114(1) may send the data-plane traffic 130 to one of the data nodes 116 based at least in part on the hash value.

FIG. 3 illustrates a data flow diagram of an example traffic flow 300 between various nodes and/or devices of a communication session to establish load balancing of traffic using SPI values of a packet header. The example traffic flow 300 includes a client 302, a router/load balancer 304, a first headend 306, and a second headend 308. In examples, the first headend 306 and the second headend 308 may comprise data nodes, control nodes, servers, and/or the like. For instance, the first headend 306 may comprise a control node and the second headend 308 may comprise a data node.

To begin the example traffic flow 300, the client 302 sends a connection request packet 310 to the router/load balancer 304. The connection request packet 310 may indicating a request to establish an encrypted tunnel such that traffic may flow from the client 302 to the second headend 308. The connection request packet 310 may include a set of 5-tuple values. The router/load balancer 304, upon receiving the connection request packet 310, may send the connection request packet 310 to the first headend 306. The router/load balancer 304 may determine to send the connection request packet 310 to the first headend 306 based at least in part on computing a hash value representing the set of 5-tuple values included in the connection request packet 310. Additionally, or alternatively, the router/load balancer 304 may determine to send the connection request packet 310 to the first headend 306 based at least in part on an ECMP routing strategy.

After receiving the connection request packet 310, the first headend 306 may establish an IKE session 314 with the client 302. In this way, IKE traffic may flow between the client 302 and the first headend 306. In some instances, establishing the IKE session 314 may include authenticating a user associated with the client 302, such as by determining an identity of the user. Once the IKE session is established, the first headend may send a reply packet 316 to the client 302. The reply packet 316 may indicate that the IKE session is established.

The client 302 may then send ESP traffic 318 to the router/load balancer 304, and the router/load balancer 304 may forward this ESP traffic 318 to the second headend 308. After receiving the ESP traffic 318, the second headend 308 may generate an SPI value 320 to be used by the client 302 for sending data-plane traffic over an ESP channel. The second headend 308 may further associate the SPI value with the set of 5-tuple values. In this way, the second headend 308 may update the router/load balancer 304 with the 5-tuple and SPI mapping 322. The 5-tuple and SPI mapping 322 may, in some instances, comprise a hash value. Additionally, or alternatively, the 5-tuple and SPI mapping 322 may indicate that future data-plane packets, which include certain sets of 5-tuple values and certain SPI values, are to be sent to the second headend 308. The second headend 308, may then send a reply packet 324 back to the client 302. The reply packet 324 may indicate that the client 302 may begin using the ESP channel or encrypted tunnel to send data-plane traffic 326.

The client 302, after receiving the reply packet 324, may begin sending data-plane traffic 326 over an ESP channel. When the router/load balancer 304 receives the data-plane traffic, the router/load balancer 304 may compute a hash value representing the network 5-tuple and the SPI value 328. For instance, a packet of the data-plane traffic 326 may include the SPI value and the network 5-tuple. Based at least in part on computing the hash, the router/load balancer 304 may send the data-plane traffic 326 to the second headend 308. For instance, the router/load balancer 304 may send the data-plane traffic 326 to the second headend 308 based at least in part on the 5-tuple and SPI mapping 322.

Figure 4A:
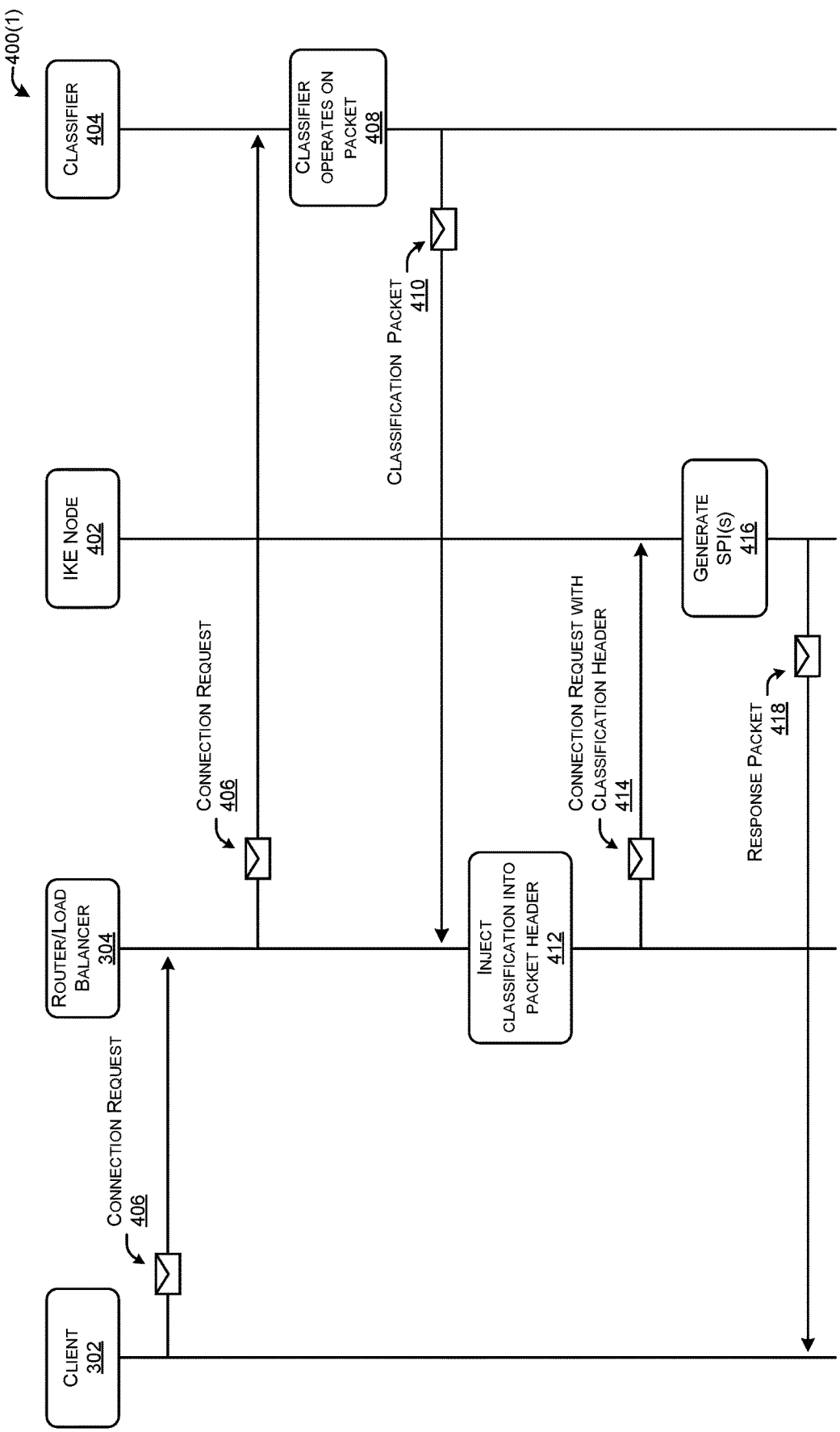

FIGS. 4A and 4B illustrate data flow diagrams of example traffic flows 400(1) and 400(2) between various nodes and/or devices of a communication session to indicate QoS-type information in an SPI value and/or SPI value field of a packet header. The example traffic flows 400(1) and 400(2) may include a client 302, a router/load balancer 304, an IKE node 402, and a classifier 404.

With respect to FIG. 4A, the client 302 may send a connection request packet 406 to the router/load balancer 304. In some examples, the connection request packet 406 may comprise an IKE SA INIT Request packet. The connection request packet 406 may indicate a request to establish an encrypted tunnel (e.g., IPsec connection) for use by the client 302 to send data to and/or receive data from a service. The router/load balancer 304, upon receiving the connection request packet 406, may call the classifier 404 to determine a traffic class associated with the connection request packet 406. For instance, the connection request packet 304 may indicate a type of traffic (e.g., voice, video, audio, web, etc.) the client 302 wishes to send and/or receive, and the classifier 404 may be configured to determine what type of traffic that is. Additionally, or alternatively, the connection request packet 406 may include a request to establish multiple connections, each connection being associated with a different traffic class and/or priority. In some examples, calling the classifier 404 may comprise sending, by the router/load balancer 304, the connection request packet 406 to the classifier 404.

In some examples, the classifier 404 may operate on the packet 408 to determine the traffic class associated with the connection request packet 406. For instance, the classifier 404 may determine that the connection request packet 406 comprises a request to establish one or more of a voice traffic channel, a video traffic channel, an audio traffic channel, a web traffic channel, and/or the like. The classifier 404 may, after determining the traffic class, send a classification packet 410 indicating the traffic class associated with the connection request packet 406. The classifier 404 may send the classification packet 410 to the router/load balancer 304. In turn, the router/load balancer 304 may inject an indication of the traffic class classification into a packet header of the connection request packet 406. In this way, the connection request packet 406 may comprise an updated connection request packet 414 that includes an indication of the traffic class classification information in its packet header.

The router/load balancer 304 may send the updated connection request packet 414 to a control node such as IKE node 402. The IKE node 402 may receive the updated connection request packet 414. Based at least in part on the traffic class classification information included in the packet header of the updated connection request packet 414, the IKE node 402 may generate one or more SPI values 416. The one or more SPI values 416 may, in whole or in part, indicate a traffic class according to which data-plane traffic is to be handled. That is, a specific SPI value may comprise a unique combination of bits, and a first combination of bits of the unique combination of bits (e.g., first portion of the SPI value) may indicate the traffic class and a second combination of bits of the unique combination of bits (e.g., second portion of the SPI value) may identify an security association between the client 302 and one or more hosts associated with an encrypted tunnel connection. Stated another way, an SPI value field of a data-plane packet header may include both the first combination of bits indicating the traffic class and the second combination of bits identifying the security association between the client 302 and the one or more hosts associated with the encrypted tunnel connection.

After generating the one or more SPI values 416, the IKE node 402 may send a response packet 418. In some instances, the response packet 418 may comprises an IKE INIT Response packet. Additionally, or alternatively, the response packet 418 may include some or all of the one or more SPI values 416. In this way, the client 302 may use a first SPI value of the one or more SPI values 416 to send first data-plane traffic according to a first traffic class associated with a first QoS metric and may use a second SPI value of the one or more SPI values 416 to send second data-plane traffic according to a second traffic class associated with a second QoS metric.

With respect to FIG. 4B, the client 302 may send a connection request packet 406 to the router/load balancer 304. In some examples, the connection request packet 406 may comprise an IKE SA INIT Request packet indicating a request for the IKE node 402 to establish an IPsec security association. The connection request packet 406 may indicate a request to establish an encrypted tunnel (e.g., IPsec connection) for use by the client 302 to send data to and/or receive data from a service. The router/load balancer 304, upon receiving the connection request packet 304, may send the connection request packet 406 to the IKE node 402. In some examples, the router/load balancer 304 may compute a hash value representing a network 5-tuple included in the connection request packet 406 and, based at least in part on the hash value, send the connection request packet 406 to the IKE node 402. For instance, the router/load balancer 304 may determine, using an ECMP routing strategy and based at least in part on the hash value, to send the connection request packet to the IKE node 402.

In order for the IKE node 402 to generate one or more SPI values that match the right traffic class, the IKE node 402 may call the classifier 404 before establishing the connection for the client 302. For instance, the IKE node 402 may send the connection request packet 406 or a portion of the connection request packet 406 to the classifier so that the classifier 404 may determine a traffic class associated with the connection request packet 406. For instance, the connection request packet 406 may indicate a type of traffic (e.g., voice, video, audio, web, etc.) the client 302 wishes to send and/or receive, and the classifier 404 may be configured to determine what type of traffic that is. Additionally, or alternatively, the connection request packet 406 may include a request to establish multiple connections, each connection being associated with a different traffic class and/or priority.

In some examples, the classifier 404 may operate on the connection request packet 408 to determine the traffic class associated with the connection request packet 406. For instance, the classifier 404 may determine that the connection request packet 406 comprises a request to establish one or more of a voice traffic channel, a video traffic channel, an audio traffic channel, a web traffic channel, and/or the like. The classifier 404 may, after determining the traffic class, send a classification packet 410 indicating the traffic class associated with the connection request packet 406. The classifier 404 may send the classification packet 410 to the IKE node 402.

In some examples, the IKE node 402 may receive the classification packet 410. Based at least in part on the traffic class associated with the connection request packet 406, the IKE node 402 may generate one or more SPI values 416. The one or more SPI values 416 may, in whole or in part, indicate a traffic class according to which data-plane traffic is to be handled. That is, a specific SPI value may comprise a unique combination of bits, and a first combination of bits of the unique combination of bits (e.g., first portion of the SPI value) may indicate the traffic class and a second combination of bits of the unique combination of bits (e.g., second portion of the SPI value) may identify an security association between the client 302 and one or more hosts associated with an encrypted tunnel connection. Stated another way, an SPI value field of a data-plane packet header may include both the first combination of bits indicating the traffic class and the second combination of bits identifying the security association between the client 302 and the one or more hosts associated with the encrypted tunnel connection.

After generating the one or more SPI values 416, the IKE node 402 may send a response packet 418 to the client 302. In some instances, the response packet 418 may comprises an IKE INIT Response packet. Additionally, or alternatively, the response packet 418 may include some or all of the one or more SPI values 416. In this way, the client 302 may use a first SPI value of the one or more SPI values 416 to send first data-plane traffic according to a first traffic class associated with a first QoS metric and may use a second SPI value of the one or more SPI values 416 to send second data-plane traffic according to a second traffic class associated with a second QoS metric.

Figure 5A:
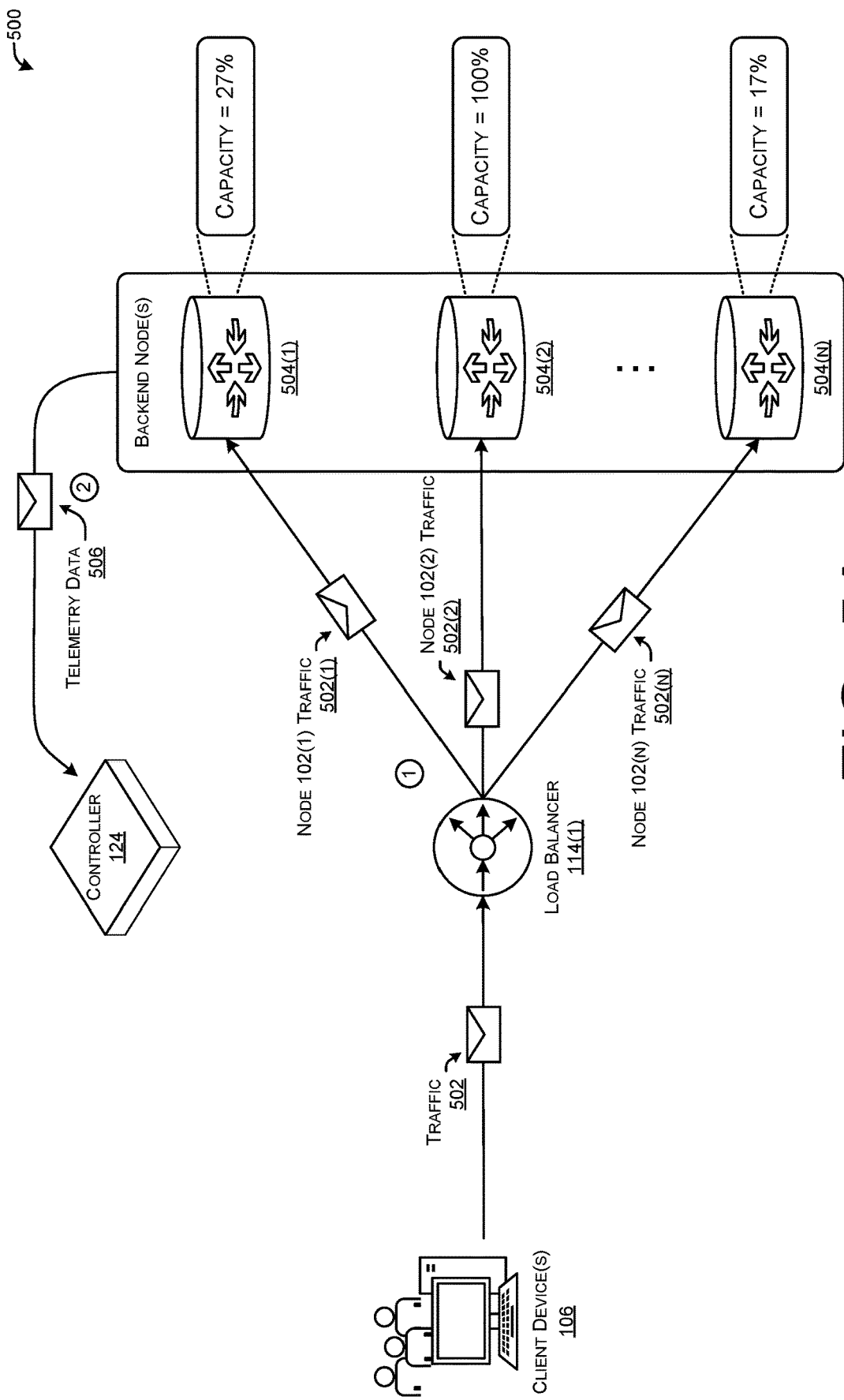
FIGS. 5A-5C collectively illustrate a schematic view of an example data flow associated with performing encrypted tunnel migration.
Figure 5B:
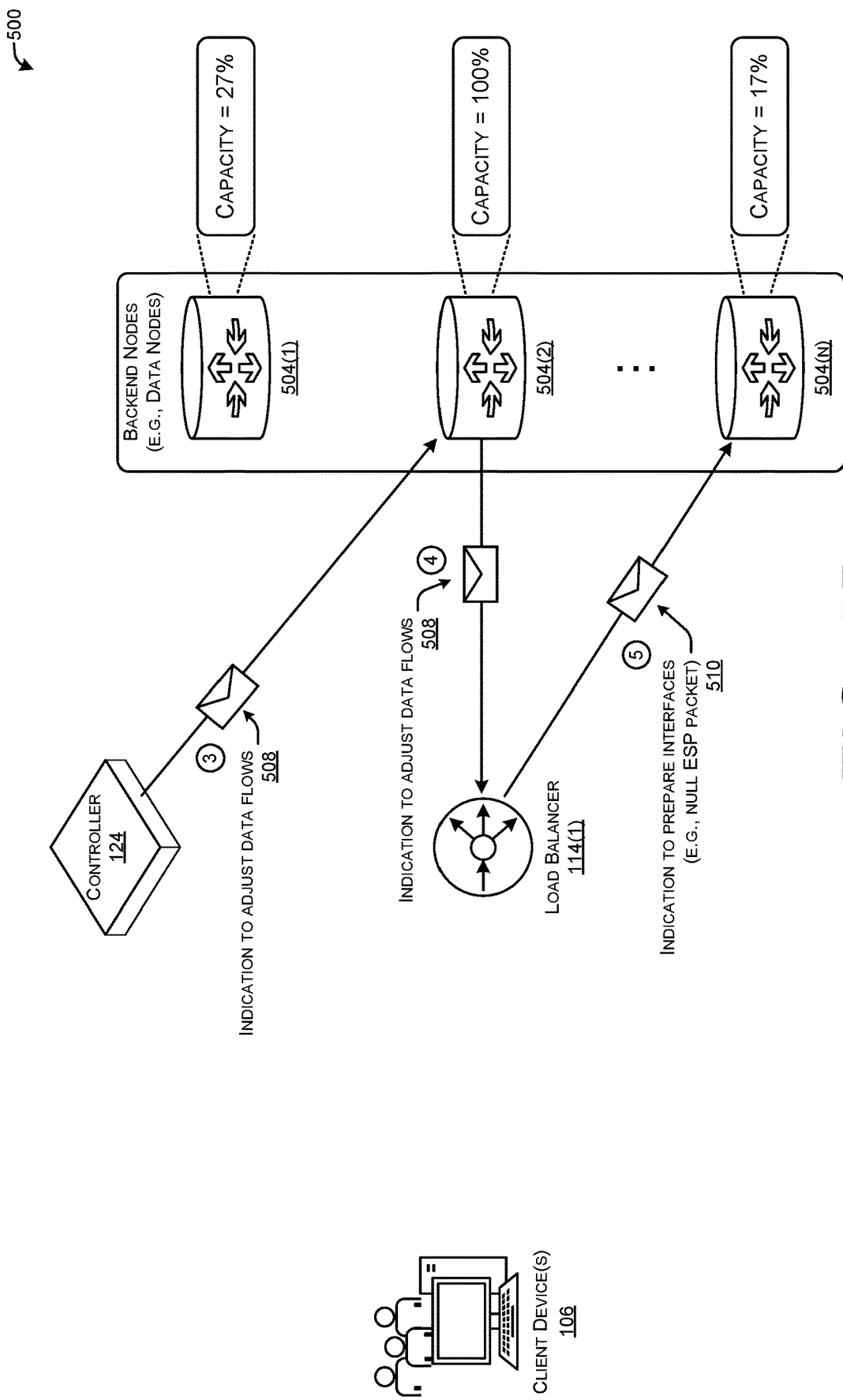
Figure 5C:
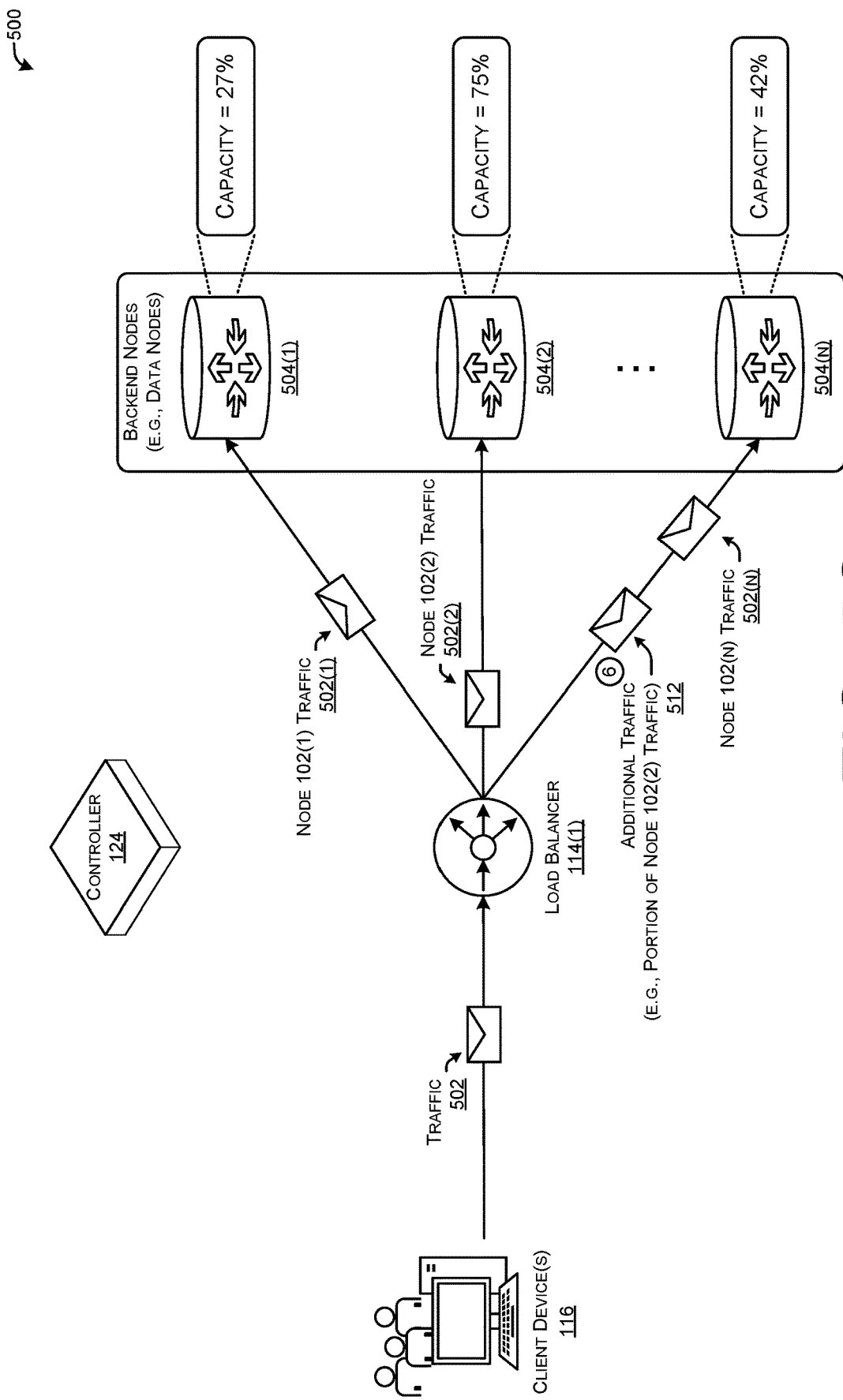

FIGS. 5A-5C collectively illustrate a schematic view of an example data flow 500 associated with performing encrypted tunnel migration. At "1," the load balancer 114(1) may receive traffic 502 from one or more client devices 106 and forward the traffic 502 to one or more backend nodes 504(1)-504(N) (hereinafter referred to collectively as "backend nodes 504") (where N represents any number greater than or equal to one). The traffic 502 may comprise first traffic 502(1) that is to be sent to node 504(1), second traffic 502(2) that is to be sent to node 504(2), and Nth traffic 502(N) (where N represents any number greater than or equal to one) that is to be sent to node 504(N). Additionally, the traffic 502 may comprise data-plane traffic and/or control-plane traffic.

In some examples, the load balancer 114(1) may determine that the first traffic 502(1), the second traffic 502(2), and the Nth traffic 502(N) are to be sent to nodes 504(1), 504(2), and 504(N), respectively, based at least in part on an ECMP routing strategy. The ECMP routing strategy may use 6-tuple logic for determining which node of the backend nodes 504 to send individual packets of the traffic 502. The 6-tuple logic may include an SPI value of an individual packet and a set of 5-tuple values (source address, destination address, source port, destination port, and protocol) of the individual packet. For instance, individual packets of the first traffic 502(1), the second traffic 502(2), and the Nth traffic 502(N) may each comprise a respective SPI value and a respective set of 5-tuple values, and the load balancer 114(1) may compute a respective hash value for each individual packet, the respective hash value representing the respective SPI value and the respective set of 5-tuple values for each individual packet. In this way, each respective hash value for each individual packet of the traffic 502 may indicate which node of the backend nodes 504 that the individual packet is to be sent to.

At "2," the controller 124 may receive telemetry data 506 associated with the backend nodes 504. For instance, node 504(1) may send first telemetry data to the controller 124, node 504(2) may send second telemetry data to the controller 124, and node 504(N) may send Nth telemetry data to the controller 124. In some examples, the telemetry data 506 may indicate load capacities associated with each one of the backend nodes 504. That is, the telemetry data 506 may indicate that node 504(1) is operating at 27% capacity, node 504(2) is operating at 100% capacity, and node 504(N) is operating at 17% capacity. In some examples, a load capacity associated with a backend node may comprise one or more of a tunnel load capacity associated with a backend node, an amount of hardware resources available/used by a backend node, an amount of virtual computing resources available/used by a backend node, and the like.

At "3," the controller 124 may send an indication 508 for the load balancer 114(1) to adjust data flows. That is, to adjust where (e.g., which node of the backend nodes 504) the load balancer 114(1) is sending various portions of the traffic 502. For instance, based at least in part on the telemetry data 506, the controller 124 may determine that the load capacity of node 504(2) exceeds a threshold load capacity. The threshold load capacity may comprise, for instance, a percentage value (e.g., 80%, 85%, 90%, 100%, etc.). Additionally, the threshold load capacity may be dynamic and change (e.g., from 80% to 90%) depending on a time of day, day of a week, current demand, and the like. In some instances, the controller 124 may send the indication directly to the load balancer 114(1). Additionally, or alternatively, the controller 124 may send the indication to the node 504(2), as shown in FIG. 5B.

At "4," the node 504(2) may send or forward the indication 508 to the load balancer 114(1) based at least in part on receiving the indication from the controller 124. The indication 508 may be configured to prompt the load balancer 114(1) to perform one or more actions to adjust where it is sending data flows. Accordingly, at "5," the load balancer 114(1), based at least in part on receiving the indication 508, may send an indication 510 to the node 504(N) to prompt the node 504(N) to prepare one or more interfaces such that a portion of the second traffic 502(2) may be sent/redirected to the node 504(N). In at least one example, the node 504(N) may comprise a data node for processing ESP traffic and the indication 510 may comprise a null ESP packet that includes a source IP address and port associated with a client device of the one or more client devices 106. In this way, when the node 504(N) receives the null ESP packet, the node 504(N) may begin setting up interfaces in preparation for receiving an IPsec security association. Additionally, the load balancer 114(1) may send a rekey request to a control node that is responsible for a respective IKE session that is associated with the IPsec security association.

At "6," the load balancer 114(1) may begin sending additional traffic 512 to the node 504(N). The additional traffic 512 may comprise at least a portion of the second traffic 502(2) that was previously being sent to the node 504(2). In this way, the load capacity of node 504(2) may be decreased (e.g., to 75%) and the load capacity of the node 504(N) may be increased (e.g., to 42%). In some examples, the load balancer 114(1) may begin sending the additional traffic 512 to the node 504(N) based at least in part on receiving the indication 508 to adjust data flows. Additionally, the load balancer 114(1) may determine that the additional traffic 512 is to be sent to the node 504(N) based at least in part on an SPI value included in an individual packet of the additional traffic 512. For instance, in some examples, based at least in part on the load balancer 114(1) sending the rekey request, the SPI value included in the individual packet may not be known by the load balancer 114(1) because the IKE node may have issued a new SPI value to be used by the client device. Accordingly, the load balancer 114(1) may recognize a set of 5-tuple values included in the individual packet and determine, based at least in part on recognizing the set of 5-tuple values and based at least in part on issuing the rekey request, that the additional traffic 512 is to be sent to the node 504(N). Additionally, the load balancer 114(1) may store an association between the new/unknown SPI value and the set of 5-tuple values.

FIGS. 6, 7, 8, and 9 illustrate logic flow diagrams of various example methods associated with the technologies presented herein for load balancing encrypted traffic based on SPI values. The logical operations described herein with respect to FIGS. 6, 7, 8, and 9 may be implemented (1) as a sequence of computer-implemented acts or program modules running on a computing system and/or (2) as interconnected machine logic circuits or circuit modules within a computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6, 7, 8, and 9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 6 illustrates a logic flow diagram of an example method 600 for maintaining QoS treatment of packets by using SPI values. The example method 600 begins at operation 602, which includes receiving, from a client device and at a network device of a network, a request to establish an encrypted tunnel through the network such that data-plane traffic may flow between the client device and a service via the encrypted tunnel. For instance, the load balancer 114(1) and/or the control node 118(1) may receive the request from a first client device of the one or more client devices 106. Additionally, in some examples the request may comprise an IKE SA INIT Request packet to establish an IPsec SA between the first client device and the first data node 116(1) such that the data-plane traffic 130 may flow between the client device and the service 110.

At operation 604, the example method 600 includes determining that the data-plane traffic is of a particular traffic class from among a group of traffic classes, the particular traffic class being associated with a particular quality of service (QoS) performance metric. In some examples, the control node 118(1) may call a classifier to determine the particular traffic class. Additionally, or alternatively, the load balancer 114(1) may call the classifier to determine the particular traffic class.

At operation 606, the example method 600 includes generating a security parameter index (SPI) value to be used by the client device for the data-plane traffic, the SPI value corresponding to the particular traffic class. For instance, the control node 118(1) may generate the SPI value to be used by the first client device of the one or more client devices 106. A portion of the SPI value and/or SPI value field may correspond to the particular traffic class. That is, in some examples, the SPI value may comprise a unique combination of bits and portion of bits of the unique combination of bits may correspond to the particular traffic class.

At operation 608, the example method 600 includes sending, to the client device, an indication of the SPI value. For instance, the control node 118(1) may send the indication of the SPI value directly to the first client device of the one or more client devices 106 by performing direct server return (DSR) to bypass at least the load balancers 114. In some examples, the indication may comprise an IKE INIT Response packet indicating that an IPsec SA has been established for the first client device of the one or more client devices 106.

At operation 610, the example method 600 includes receiving, at a load balancing node associated with the network, a data packet of the data-plane traffic that includes the SPI value. For instance, the load balancer 114(1) may receive the data packet of the data-plane traffic 130 from the edge router 112(1) or, in instances where the load balancing techniques may be performed by the edge router 112(1), directly from the first client device. In some instances, the edge router 112(1) may perform an ECMP routing strategy based on computing a hash value representing a set of network 5-tuple values included in the data packet and determine to send the data packet to the load balancer 114(1).

At operation 612, the example method 600 includes, based at least in part on the data packet including the SPI value, sending the data packet through the network such that the data packet is handled according to the particular QoS performance metric. For instance, the load balancer 114(1) may send the data packet to the data node 116(1) based on performing an ECMP routing strategy that includes computing a hash value representing the SPI value and the set of network 5-tuple values included in the data packet. Additionally, the data node 116(1) may be associated with the traffic class, and the load balancer 114(1) may determine to send the data packet to the data node 116(1) based at least in part on the hash value and/or determining that the SPI value is associated with the traffic class.

Figure 7:
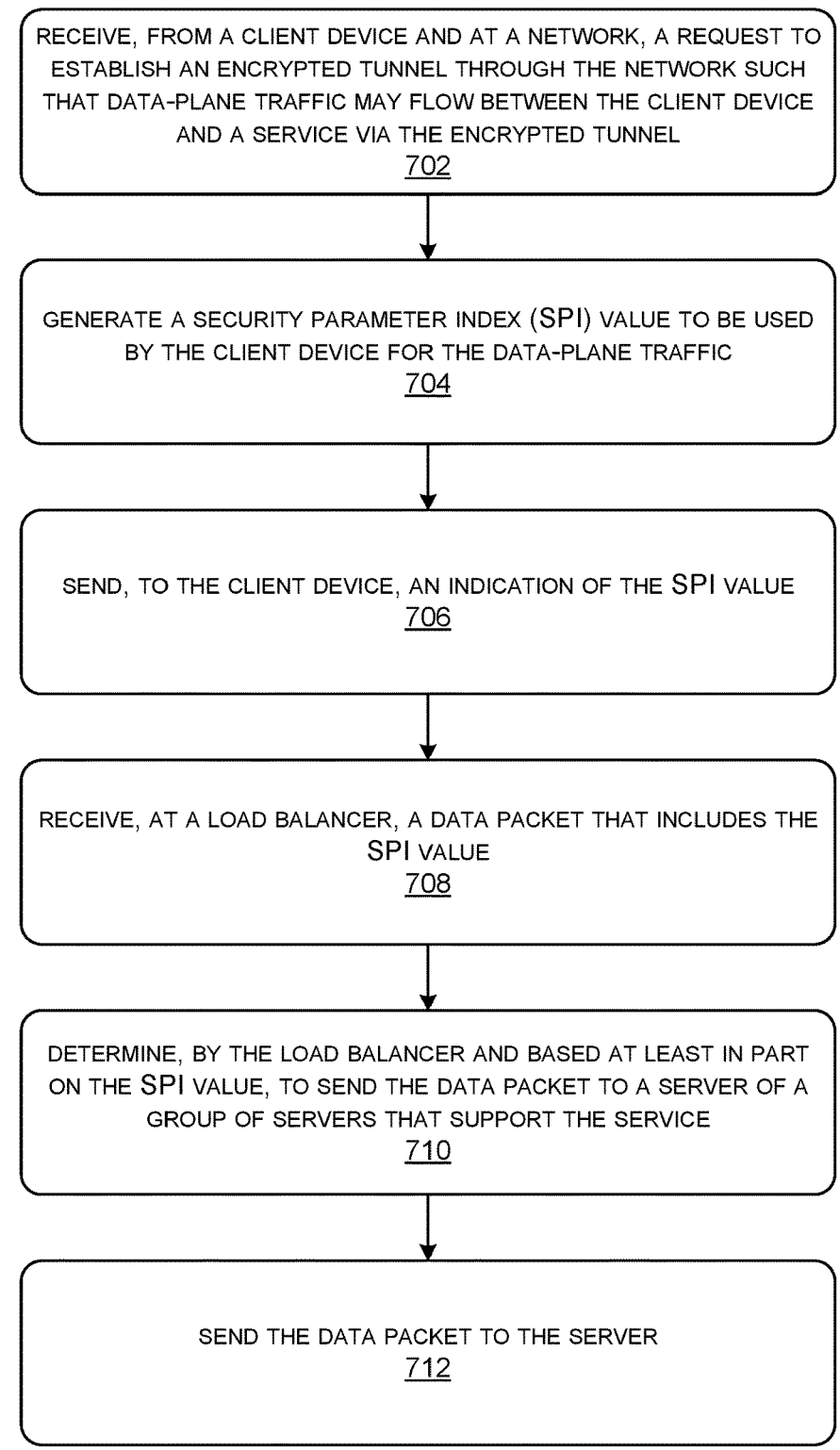
FIG. 7 illustrates a logic flow diagram of an example method for load balancing traffic based on SPI values of packet headers.

FIG. 7 illustrates a logic flow diagram of an example method 700 for load balancing traffic based on SPI values of packet headers. The example method 700 begins at operation 702, which includes receiving, from a client device and at a network device of a network, a request to establish an encrypted tunnel through the network such that data-plane traffic may flow between the client device and a service via the encrypted tunnel. For instance, the load balancer 114(1) and/or the control node 118(1) may receive the request from a first client device of the one or more client devices 106. Additionally, in some examples the request may comprise an IKE SA INIT Request packet to establish an IPsec SA between the first client device and the first data node 116(1) such that the data-plane traffic 130 may flow between the client device and the service 110.

At operation 704, the example method 700 includes generating a security parameter index (SPI) value to be used by the client device for the data-plane traffic. For instance, the control node 118(1) may generate the SPI value to be used by the first client device of the one or more client devices 118(1). In some examples, the SPI value may identify an IPsec SA between the first client device and one or more of the data nodes 116 and/or one or more interfaces of the data nodes 116.

At operation 706, the example method 700 includes sending, to the client device, an indication of the SPI value. For instance, the control node 118(1) may send the indication of the SPI value directly to the first client device of the one or more client devices 106 by performing direct server return (DSR) to bypass at least the load balancers 114. In some examples, the indication may comprise an IKE INIT Response packet indicating that an IPsec SA has been established for the first client device of the one or more client devices 106.

At operation 708, the example method 700 includes receiving, at a load balancer, a data packet that includes the SPI value. For instance, the load balancer 114(1) may receive the data packet of the data-plane traffic 130 from the edge router 112(1) or, in instances where the load balancing techniques may be performed by the edge router 112(1), directly from the first client device. In some instances, the edge router 112(1) may perform an ECMP routing strategy based on computing a hash value representing a set of network 5-tuple values included in the data packet and determine to send the data packet to the load balancer 114(1).

At operation 710, the example method 700 includes determining, by the load balancer and based at least in part on the SPI value, to send the data packet to a server of a group of servers that support the service. In some examples, determining to send the data packet tot the server of the group of servers may further comprise determining an encrypted tunnel between the load balancer and the server that is to be used for sending the data packet to the server. For instance, the load balancer 114(1) may send the data packet to the data node 116(1) based on performing an ECMP routing strategy that includes computing a hash value representing the SPI value and the set of network 5-tuple values included in the data packet.

At operation 712, the example method 700 includes sending the data packet to the server. For instance, the load balancer 114(1) may send the data packet of the data plane traffic 130 to the data node 116(1) such that the data node 116(1) may forward the data packet to the firewall node 120(1), and then the firewall node 120(1) may forward the data packet downstream to the service 110.

Figure 8:
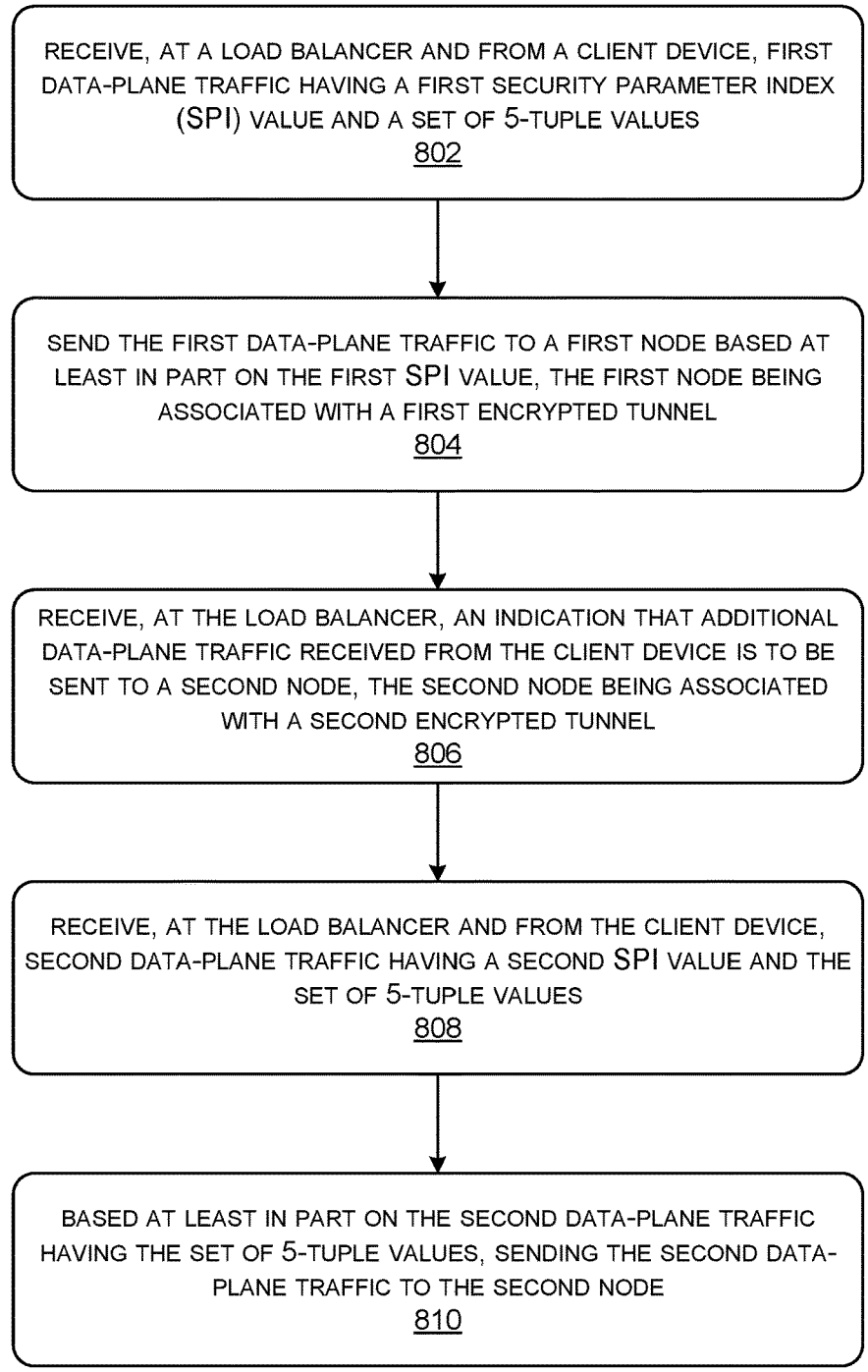
FIG. 8 illustrates a logic flow diagram of an example method for performing encrypted tunnel migration.

FIG. 8 illustrates a logic flow diagram of an example method 800 for performing encrypted tunnel migration. The example method 800 begins at operation 802, which includes receiving, at a load balancer and from a client device, first data-plane traffic having a first security parameter index (SPI) value and a set of 5-tuple values. For instance, the load balancer 114(1) may receive the first data-plane traffic from the edge router 112(1) or, in instances where the load balancing techniques may be performed by the edge router 112(1), directly from the first client device. In some instances, the edge router 112(1) may perform an ECMP routing strategy based on computing a first hash value representing the set of network 5-tuple values included in the first data-pane traffic and determine to send the first data-plane traffic to the load balancer 114(1).

At operation 804, the example method 800 includes sending the first data-plane traffic to a first node based at least in part on the first SPI value, the first node being associated with a first encrypted tunnel. For instance, the load balancer 114(1) may send the first data-plane traffic 130 to the data node 116(1). For instance, the first SPI value may identify an IPsec SA between the client device and the data node 116(1). In some examples, sending the first data-plane traffic to the first node may be based at least in part on computing a second hash value representing the first SPI value and a set of network 5-tuple values of the first data-plane traffic.

At operation 806, the example method 800 includes receiving, at the load balancer, an indication that additional data-plane traffic received from the client device is to be sent to a second node, the second node being associated with a second encrypted tunnel. For instance, the indication may indicate that the first node is operating at a maximum load capacity or that the first node is about to lose connectivity, go away, be serviced, and the like. The load balancer may receive the indication from a controller, such as controller 124, and/or from a node, such as one of the control nodes 118 or the data nodes 116. In some examples, the indication may prompt the load balancer to send, to one of the control nodes 118, for instance, a rekey request to establish a new IP sec SA for the client device. Additionally, or alternatively, the indication may prompt the load balancer to send, to a second data node, such as data node 116(N), for instance, a null ESP packet that includes an IP address and port of the client device such that the second data node may begin setting up interfaces to receive the addition data-plane traffic.

At operation 808, the example method 800 includes receiving, at the load balancer and from the client device, second data-plane traffic having a second SPI value and the set of 5-tuple values. For instance, the load balancer 114(1) may receive the second data-plane traffic from the edge router 112(1) or, in instances where the load balancing techniques may be performed by the edge router 112(1), directly from the first client device. In some instances, the edge router 112(1) may perform an ECMP routing strategy based on computing a third hash value representing the set of network 5-tuple values included in the second data-plane traffic. Because the data packet includes the set of network 5-tuple values, the third hash value may equal the first hash value and edge router 112(1) may forward the second data-plane traffic to the load balancer 114(1).

At operation 810, the example method 800 includes, based at least in part on the second data-plane traffic having the set of 5-tuple values, sending the second data-plane traffic to the second node. For instance, the load balancer 114(1) may send the second data-plane traffic to the data node 116(N). In some examples, the load balancer 114(1) may send the second data-plane traffic 130 to the data node 116(N) based at least in part on not recognizing the second SPI value. Additionally, the load balancer 114(1) may send the second data-plane traffic 130 to the data node 116(N) based at least in part on recognizing that the second data-plane traffic includes the set of network 5-tuple values. For example, the load balancer 114(1) may not have an association stored between the second SPI value and the set of network 5-tuple values. However, because the load balancer 114(1) may have issued the rekey request, the load balancer 114(1) may associate the second SPI value with the set of network 5-tuple values. In other words, because the load balancer 114(1) issued the rekey request, when the load balancer 114(1) receives data-plane traffic including a known set of network 5-tuple values and a new/unknown SPI value, the load balancer 114(1) may associate the new/unknown SPI value with the known set of network 5-tuple values and, accordingly, send the data-plane traffic to the data node 116(N).

Figure 9:
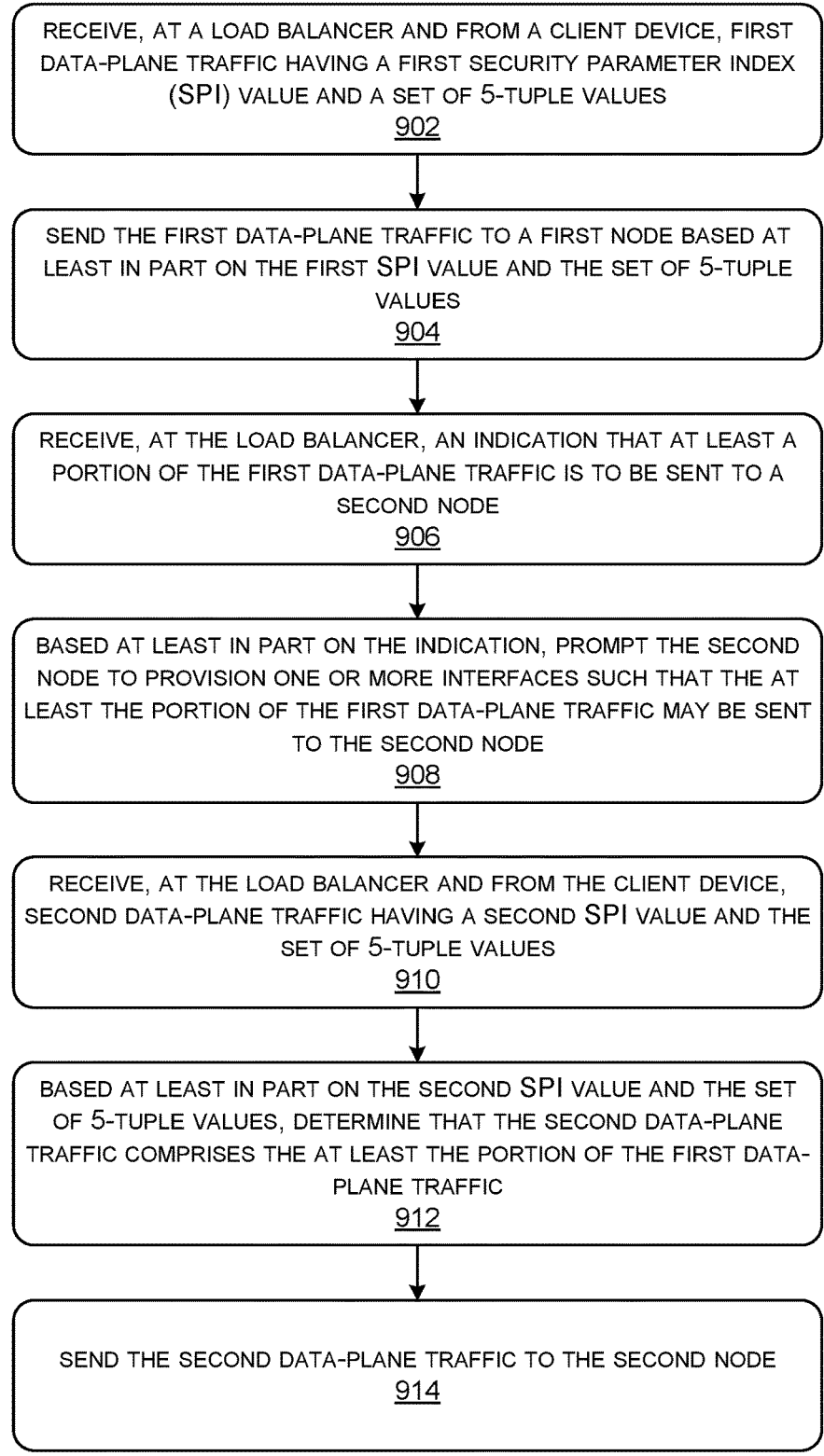
FIG. 9 illustrates a logic flow diagram of another example method for performing encrypted tunnel migration.

FIG. 9 illustrates a logic flow diagram of another example method 900 for performing encrypted tunnel migration. The example method 900 begins at operation 902, which includes receiving, at a load balancer and from a client device, first data-plane traffic having a first security parameter index (SPI) value and a set of 5-tuple values.

At operation 904, the example method 900 includes sending the first data-plane traffic to a first node based at least in part on the first SPI value and the set of 5-tuple values. For instance, the load balancer 114(1) may send the first data-plane traffic 130 to the data node 116(1). For instance, the first SPI value may identify an IPsec SA between the client device and the data node 116(1). In some examples, sending the first data-plane traffic to the first node may be based at least in part on computing a hash value representing the first SPI value and the set of network 5-tuple values of the first data-plane traffic.

At operation 906, the example method 900 includes receiving, at the load balancer, an indication that at least a portion of the first data-plane traffic is to be sent to a second node. For instance, the indication may indicate that the first node is operating at a maximum load capacity or that the first node is about to lose connectivity, go away, be serviced, and the like. The load balancer may receive the indication from a controller, such as controller 124, and/or from a node, such as one of the control nodes 118 or the data nodes 116. In some examples, the indication may prompt the load balancer to send, to one of the control nodes 118, for instance, a rekey request to establish a new IPsec SA for the client device. Additionally, or alternatively, the indication may prompt the load balancer to send, to a second data node, such as data node 116(N), for instance, a null ESP packet that includes an IP address and port of the client device such that the second data node may begin setting up interfaces to receive the portion of the first data-plane traffic.

At operation 908, the example method 900 includes, based at least in part on the indication, prompting the second node to provision one or more interfaces such that the at least the portion of the first data-plane traffic may be sent to the second node. For instance, the load balancer 114(1) may send a null ESP packet to the data node 116(N). The null ESP packet may include an IP address and/or a port associated with the client device such that the data node 116(N) may begin provisioning one or more interfaces for the portion of the first data-plane traffic.

At operation 910, the example method 900 includes receiving, at the load balancer and from the client device, second data-plane traffic having a second SPI value and the set of 5-tuple values. The second SPI value may comprise a new or unknown SPI value. That is, the second SPI value may not have been associated with the set of 5-tuple values yet by the load balancer. At operation 912, the example method 900 includes based at least in part on the second SPI value and the set of 5-tuple values, determining that the second data-plane traffic comprises the at least the portion of the first data-plane traffic. For instance, the load balancer 114(1) may keep track of all SPI values associated with the set of 5-tuple values. In this way, if the load balancer 114(1) issues a rekey request, the load balancer 114(1) may begin monitoring for new/unknown SPI values related to the set of 5-tuple values in order to determine that the second data plane traffic, which includes the set of 5-tuple values and the second (new/unknown) SPI value, comprises the portion of the first data-plane traffic.

At operation 914, the example method 900 includes sending the second data-plane traffic to the second node. For example, the load balancer 114(1) may send the second data-plane traffic to the data node 116(N). In some instances, sending the second data-plane traffic to the second node may be based at least in part determining that the second data-plane traffic comprises the portion of the first data plane traffic. Additionally, or alternatively, sending the second-data plane traffic to the second node may be based at least in part on an ECMP routing strategy and computing a hash value representing the second SPI value and the set of 5-tuple values.

Figure 10:
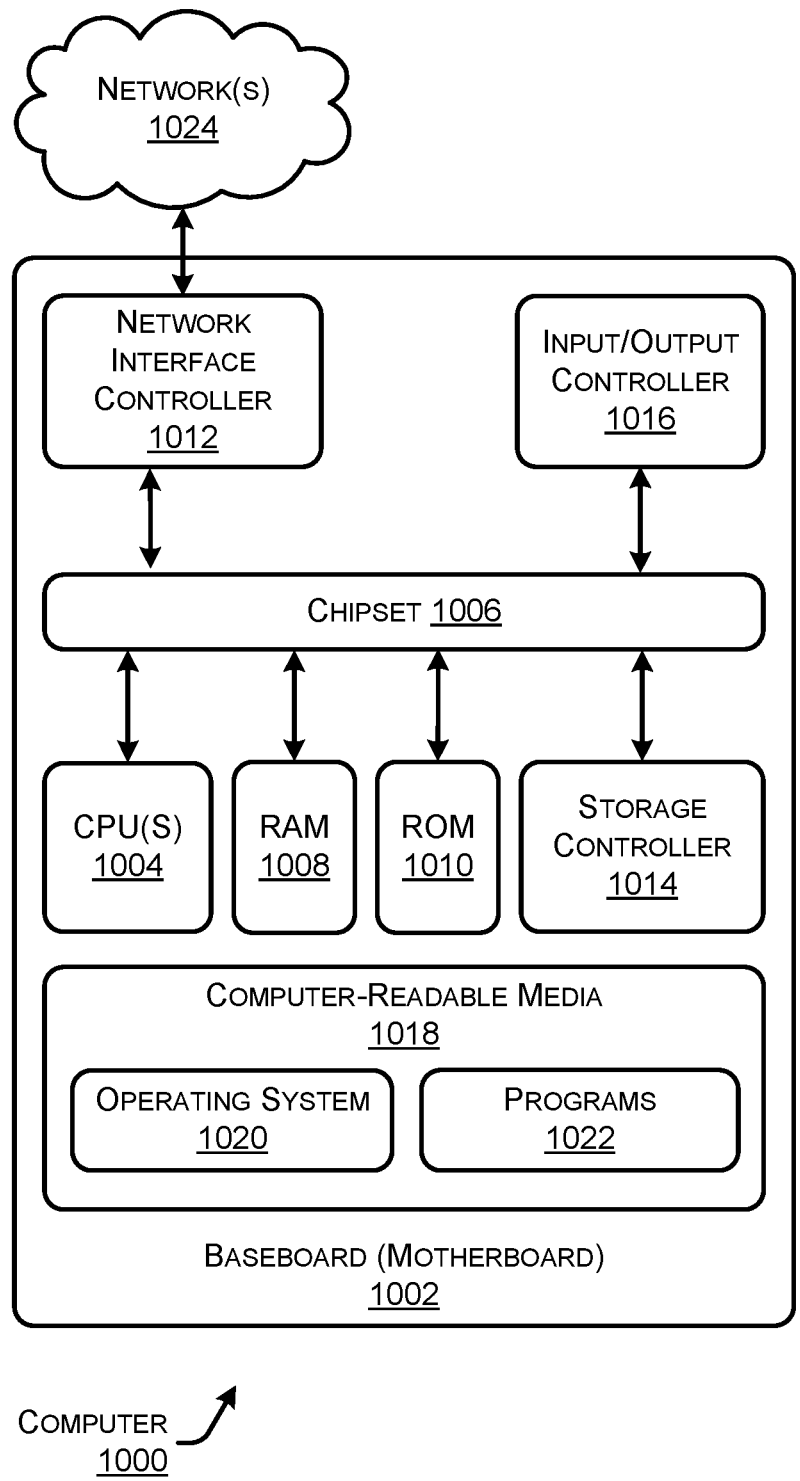
FIG. 10 illustrates a schematic view of an example computer-hardware architecture for implementing a network node and/or device, such as a load balancer, control node, data node, etc. that can be utilized to implement aspects of the various technologies presented herein.

FIG. 10 illustrates a schematic view of an example computer-hardware architecture for implementing a network node and/or device, such as a load balancer, control node, data node, etc., that can be utilized to implement aspects of the various technologies presented herein. The computer architecture shown in FIG. 10 illustrates a conventional server computer, network device, workstation, desktop computer, laptop, tablet, network appliance, e-reader, smartphone, and/or other computing device, and can be utilized to execute any of the software components presented herein. The computer 1000 may comprise networked devices such as servers, switches, routers, hubs, bridges, gateways, modems, repeaters, access points, etc.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network(s) 108 and/or the network(s) 1024. The chipset 1006 can include functionality for providing network connectivity through a NIC 1012, such as a gigabit Ethernet adapter. The NIC 1012 is capable of connecting the computer 800 to other computing devices over the network. It should be appreciated that multiple NICs 1012 can be present in the computer 1000, connecting the computer to other types of networks and remote computer systems. In some examples, the NIC 1012 may be configured to perform at least some of the techniques described herein, and may include components for performing the techniques described herein.

The computer 1000 can be connected to a storage device 1018 that provides non-volatile storage for the computer. The storage device 1018 can store an operating system 1020, programs 1022, and data, which have been described in greater detail herein. The storage device 1018 can be connected to the computer 1000 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like.

For example, the computer 1000 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the system-architecture 100 and or any components included therein, may be supported by one or more devices similar to computer 1000. Stated otherwise, some or all of the operations performed by the system-architecture 100, and or any components included therein, may be performed by one or more computer devices 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 1018 can store other system or application programs and data utilized by the computer 1000.

In one embodiment, the storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-9. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

As described herein, the computer 1000 may comprise one or more of data nodes, control nodes, firewall nodes, edge routers, and/or key-value stores. The computer 1000 may include one or more hardware processors 1004 (processors) configured to execute one or more stored instructions. The processor(s) 1004 may comprise one or more cores. Further, the computer 1000 may include one or more network interfaces (e.g., NIC 1012) configured to provide communications between the computer 1000 and other devices over a network, such as the networks 108 and 1024. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1022 may comprise any type of programs or processes to perform the techniques described in this disclosure for load balancing encrypted traffic based on SPI values of a packet header, as well as indicating QoS using SPI values and migrating encrypted connection to different hosts.

While the invention is described with respect to the specific examples, it is to be understood that the scope of the invention is not limited to these specific examples. For instance, while many of the examples are described with respect to IPsec protocols, it should be understood that the techniques described are applicable to other protocols. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, from a client device and at a network device of a network, a request to establish an encrypted tunnel through the network such that data-plane traffic flows between the client device and a service via the encrypted tunnel;
generating a security parameter index (SPI) value to be used by the client device for the data-plane traffic;
sending, to the client device, an indication of the SPI value;
receiving, at a load balancer, a data packet that includes the SPI value and a set of 5-tuple values;
computing, by the load balancer, a hash value representing the SPI value and the set of 5-tuple values;
determining, by the load balancer and based at least in part on the hash value, to send the data packet through the encrypted tunnel to a server of a group of servers that support the service; and
sending the data packet to the server.

2. The method of claim 1, wherein sending the data packet to the server comprises sending the data packet to the server according to an equal-cost multi-path (ECMP) routing algorithm.

3. The method of claim 1, wherein the data packet is a first data packet and the server is a first server, the method further comprising:
generating a second SPI value to be used by the client device for the data-plane traffic;
sending an indication of the second SPI value to the client device;
receiving, at the load balancer, a second data packet that includes the second SPI value; and
based at least in part on the second data packet including the second SPI value, sending the second data packet to a second server of the group of servers.

4. The method of claim 3, wherein the first data packet further includes a first set of 5-tuple values and the second data packet further includes a second set of 5-tuple values, the first set of 5-tuple values and the second set of 5-tuple values indicating at least that the first data packet and the second data packet were sent by the client device.

5. The method of claim 1, further comprising receiving, at the load balancer, data representative of an association between the SPI value and a set of 5-tuple values associated with the client device, wherein determining to send the data packet to the server is further based at least in part on the data.

6. The method of claim 1, wherein the hash value is computed by the load balancer using an equal-cost multi-path (ECMP) hashing algorithm.

7. The method of claim 1, wherein the SPI value is generated by the server of the group of servers that support the service.

8. A system comprising:
one or more processors; and
one or more computer-readable media storing instructions that, when executed by the one or more processors, cause the one or more processors to perform operations comprising:
receiving, from a client device, a request to establish an encrypted tunnel through a network such that data-plane traffic flows between the client device and a service via the encrypted tunnel;
generating a security parameter index (SPI) value to be used by the client device for the data-plane traffic;
sending, to the client device, an indication of the SPI value;
receiving, at a load balancer, a data packet that includes the SPI value and a set of 5-tuple values;
computing, by the load balancer, a hash value representing the SPI value and the set of 5-tuple values; and
based at least in part on the hash value, sending, via the encrypted tunnel, the data packet to a server of a group of servers that support the service.

9. The system of claim 8, wherein the server of the group of servers is identified based at least in part on inputting the hash value into an equal-cost multi-path (ECMP) routing algorithm.

10. The system of claim 8, wherein the data packet is a first data packet, the SPI value is a first SPI value, and the server is a first server, the operations further comprising:
generating a second SPI value to be used by the client device for the data-plane traffic;
sending an indication of the second SPI value to the client device;
receiving, at the load balancer, a second data packet that includes the second SPI value and the set of 5-tuple values; and
based at least in part on the second SPI value and the set of 5-tuple values, sending the second data packet to a second server of the group of servers.

11. The system of claim 8, wherein the data packet is a first data packet, the set of 5-tuple values is a first set of 5-tuple values, and the SPI value is a first SPI value, the operations further comprising:
receiving, at the load balancer and from a different client device, a second data packet that includes a second SPI value and a second set of 5-tuple values; and based at least in part on the second SPI value and the second set of 5-tuple values, sending the second data packet to the server of the group of servers.

12. The system of claim 8, the operations further comprising receiving, at the load balancer, data representative of an association between the SPI value and the set of 5-tuple values, wherein sending the data packet to the server is further based at least in part on the data.

13. The system of claim 8, wherein:
the request to establish the encrypted tunnel is received at a first control node of one or more control nodes of the network, the one or more control nodes being associated with handling control-plane traffic of the network; and
sending the data packet to the server of the group of servers comprises sending the data packet to a first data node of one or more data nodes of the network different than the one or more control nodes, the one or more data nodes being associated with handling the data-plane traffic of the network.

14. The system of claim 8, wherein the load balancer computes the hash value using an equal-cost multi-path (ECMP) hashing algorithm and the operations further comprise identifying, by the load balancer, the server of the group of servers based at least in part on the hash value.

15. A method comprising:
receiving, at a first control node of a network that is disposed between a client device and a service, control-plane traffic including a request to establish an encrypted tunnel through the network such that data-plane traffic flows between the client device and the service via the encrypted tunnel, wherein the network is configured such that the data-plane traffic flows through one or more data nodes of the network and the control-plane traffic flows through one or more control nodes of the network different than the one or more data nodes;
generating, at the first control node, a security parameter index (SPI) value to be used by the client device for the data-plane traffic;
sending, to the client device, an indication of the SPI value;
receiving, at a load balancing node of the network, a packet of the data-plane traffic that includes the SPI value and a set of 5-tuple values;
computing, by the load balancing node and using a hashing function, a hash value representing the SPI value and the set of 5-tuple values; and
based at least in part on the hash value, sending the packet to a first data node of the one or more data nodes via the encrypted tunnel.

16. The method of claim 15, further comprising identifying the first data node of the one or more data nodes based at least in part on inputting the hash value into an equal-cost multi-path (ECMP) routing algorithm.

17. The method of claim 15, wherein the packet is a first packet, the SPI value is a first SPI value, and the hash value is a first hash value, the method further comprising:
generating, at the first control node, a second SPI value to be used by the client device for the data-plane traffic;
sending an indication of the second SPI value to the client device;
receiving, at the load balancing node, a second packet of the data-plane traffic that includes the second SPI value and the set of 5-tuple values; and
based at least in part on computing a second hash value representing the second SPI value and the set of 5-tuple values, sending the second packet to a second data node of the one or more data nodes.

18. The method of claim 15, wherein the packet is a first packet, the SPI value is a first SPI value, and the set of 5-tuple values is a first set of 5-tuple values, the operations further comprising:
receiving, at the load balancing node and from a different client device, a second packet that includes a second SPI value and a second set of 5-tuple values; and
based at least in part on the second SPI value and the second set of 5-tuple values, sending the second packet to the first data node.

19. The method of claim 15, further comprising receiving, at the load balancing node, data representative of an association between the SPI value and the set of 5-tuple values, wherein sending the packet to the first data node is further based at least in part on the data.

20. The method of claim 15, wherein the set of 5-tuple values includes an address associated with the client device and a port associated with the client device, an address associated with the service and a port associated with the service, and a protocol associated with the packet.

* * * * *